United States Patent
Sugibuchi et al.

(10) Patent No.: US 9,659,088 B2
(45) Date of Patent: May 23, 2017

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Hiroki Sugibuchi, Yokohama (JP); Hiroshi Umemoto, Yokohama (JP); Motoyuki Takaai, Yokohama (JP)

(73) Assignee: FUJI XEROX CO., LTD., Tokyo (JP)

(*) Notice: Subject to any disclaimer, the term of this patent is extended or adjusted under 35 U.S.C. 154(b) by 257 days.

(21) Appl. No.: 14/245,516

(22) Filed: Apr. 4, 2014

(65) Prior Publication Data
US 2014/0372875 A1  Dec. 18, 2014

(30) Foreign Application Priority Data

Jun. 17, 2013  (JP) ................................ 2013-126383
Sep. 30, 2013  (JP) ................................ 2013-203659

(51) Int. Cl.
*G06F 17/30* (2006.01)
*G06F 17/27* (2006.01)

(52) U.S. Cl.
CPC .... *G06F 17/30713* (2013.01); *G06F 17/2715* (2013.01); *G06F 17/3071* (2013.01); *G06F 17/30598* (2013.01); *G06F 17/30705* (2013.01); *G06F 17/30722* (2013.01)

(58) Field of Classification Search
CPC ......... G06F 17/30713; G06F 17/30598; G06F 17/30795; G06F 17/3071; G06F 17/30722; G06F 17/2715; G06F 17/30705
USPC ................................ 707/737, 802; 715/243
See application file for complete search history.

(56) References Cited

U.S. PATENT DOCUMENTS

| | | | |
|---|---|---|---|
| 2003/0046297 A1* | 3/2003 | Mason | G06F 17/2715 |
| 2006/0069678 A1* | 3/2006 | Chou | G06F 17/30707 |
| 2007/0244882 A1 | 10/2007 | Cha et al. | |
| 2009/0287678 A1 | 11/2009 | Brown et al. | |
| 2009/0309961 A1* | 12/2009 | Miyashita | G06K 9/6256 348/65 |
| 2010/0030768 A1 | 2/2010 | Poblete et al. | |
| 2010/0082709 A1* | 4/2010 | Yamamoto | G06F 17/30011 707/812 |

(Continued)

FOREIGN PATENT DOCUMENTS

| | | |
|---|---|---|
| JP | 2001-249951 A | 9/2001 |
| JP | 2001-312503 A | 11/2001 |
| JP | A-2012-118977 | 6/2012 |

OTHER PUBLICATIONS

Godbole et al, "Document Classification Through Supervision of Document and Term Labels", Springer-Verlag Berlin Heidelberg 2004, PKDD 2004, LNAI 3202, pp. 185-196.*

(Continued)

*Primary Examiner* — Tony Mahmoudi
*Assistant Examiner* — Kamal Dewan
(74) *Attorney, Agent, or Firm* — Oliff PLC

(57) ABSTRACT

It is a non-transitory computer readable medium storing a program causing a computer to execute a process for information processing, the process including: calculating a feature amount of each of document contents to which common attribute information is added; and generating distribution map information by plotting each of document contents in a feature amount space on the basis of the calculated feature amount.

4 Claims, 19 Drawing Sheets

(56) References Cited

U.S. PATENT DOCUMENTS

2012/0084112 A1* 4/2012 Bagchi ............ G06Q 10/06311
                                                      705/7.14
2012/0136812 A1  5/2012 Brdiczka

OTHER PUBLICATIONS

Sep. 28, 2015 Australian Office Action issued in Australian Patent Application No. 2014202622.
Jun. 21, 2016 Office Action issued in Japanese Patent Application No. 2013-203659.

* cited by examiner

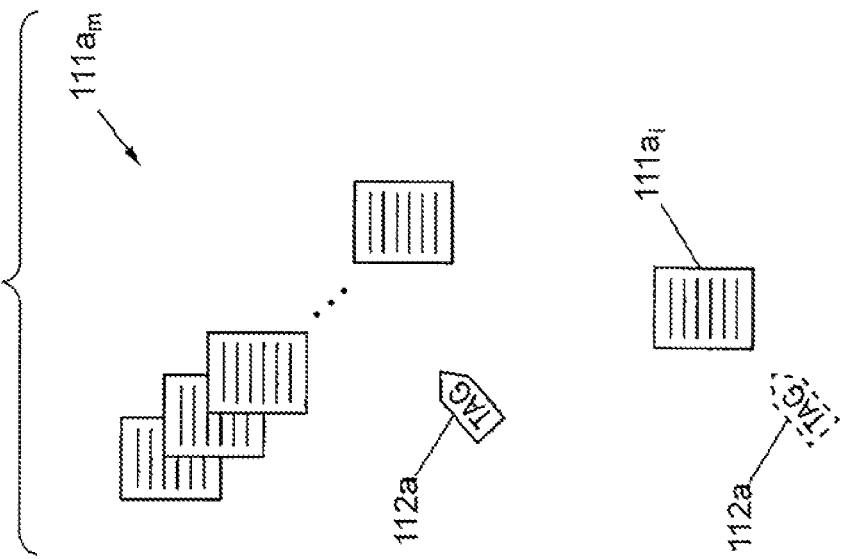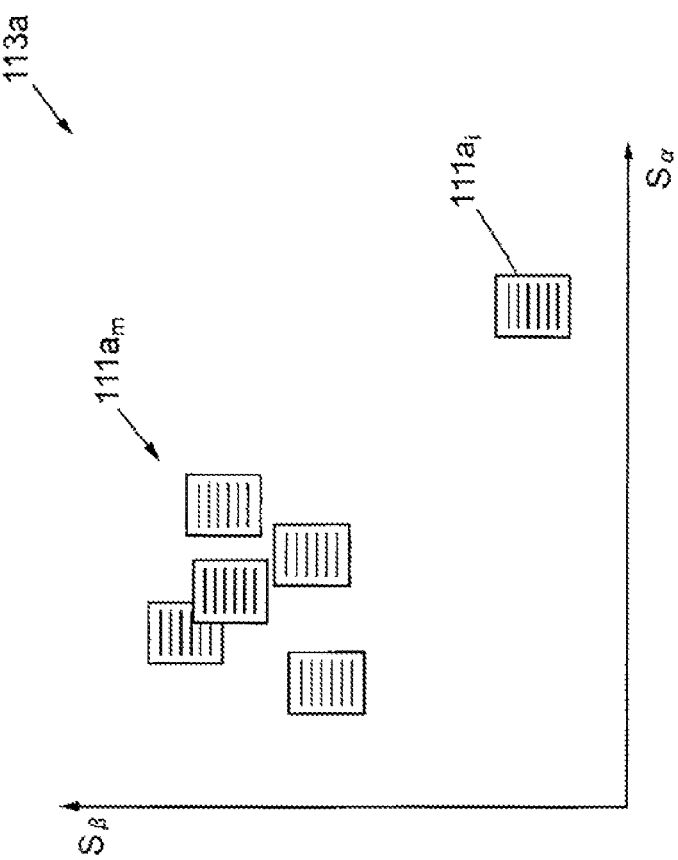

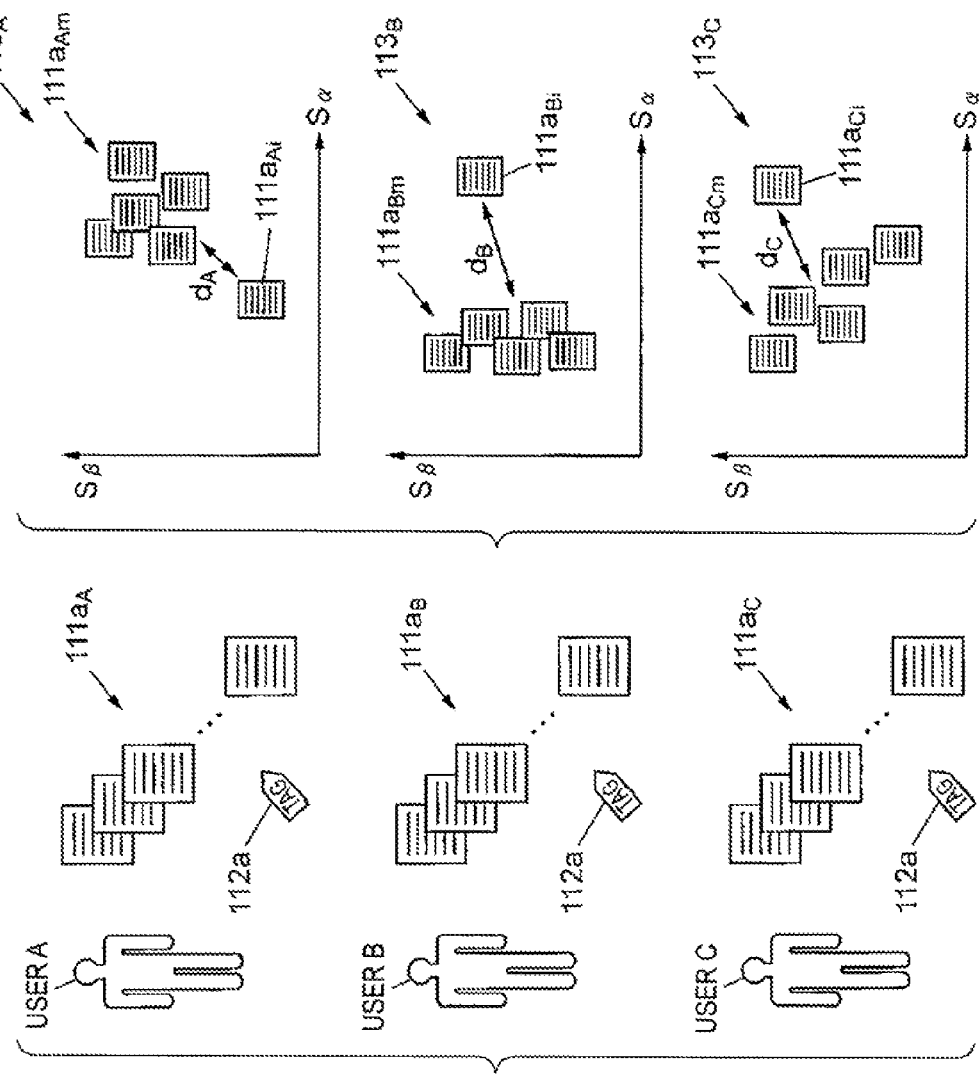

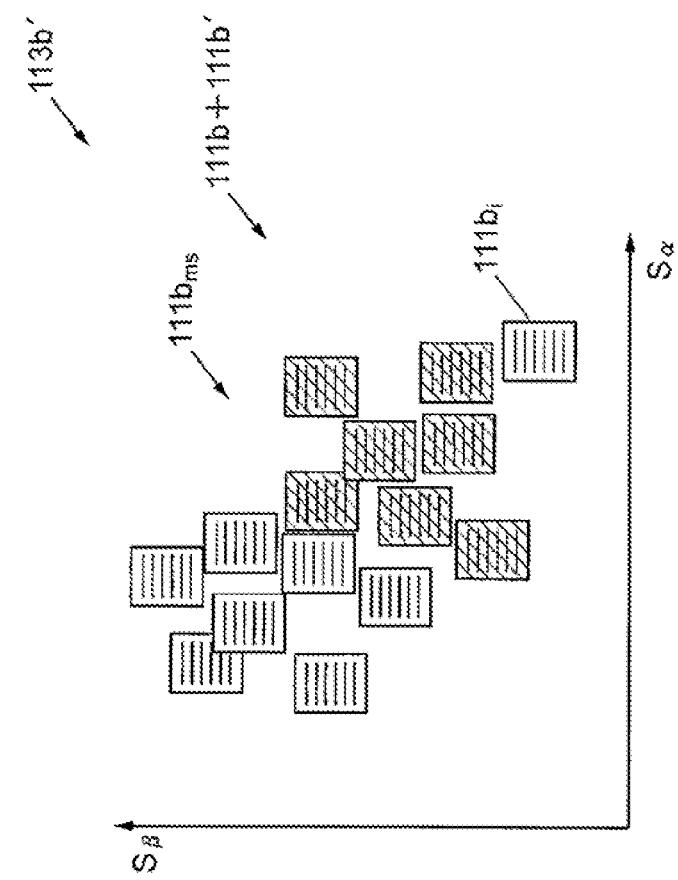
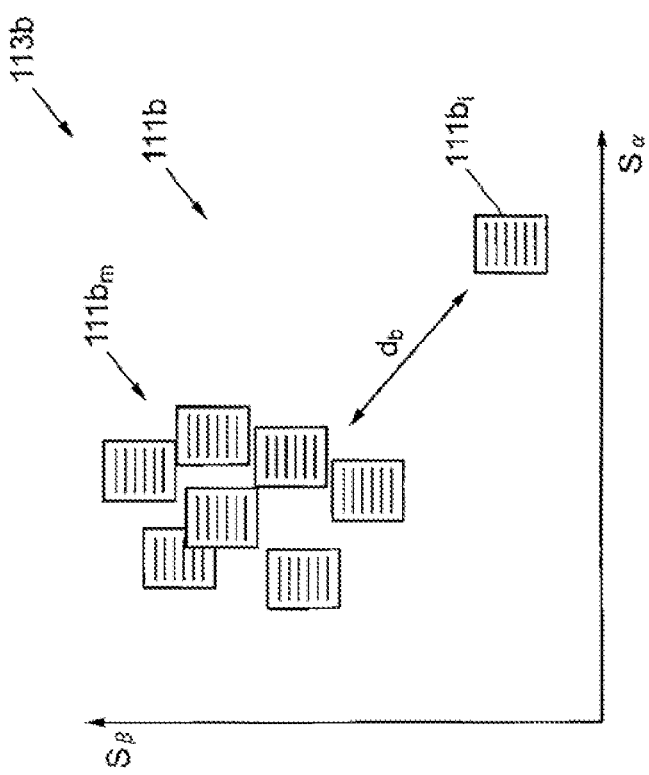

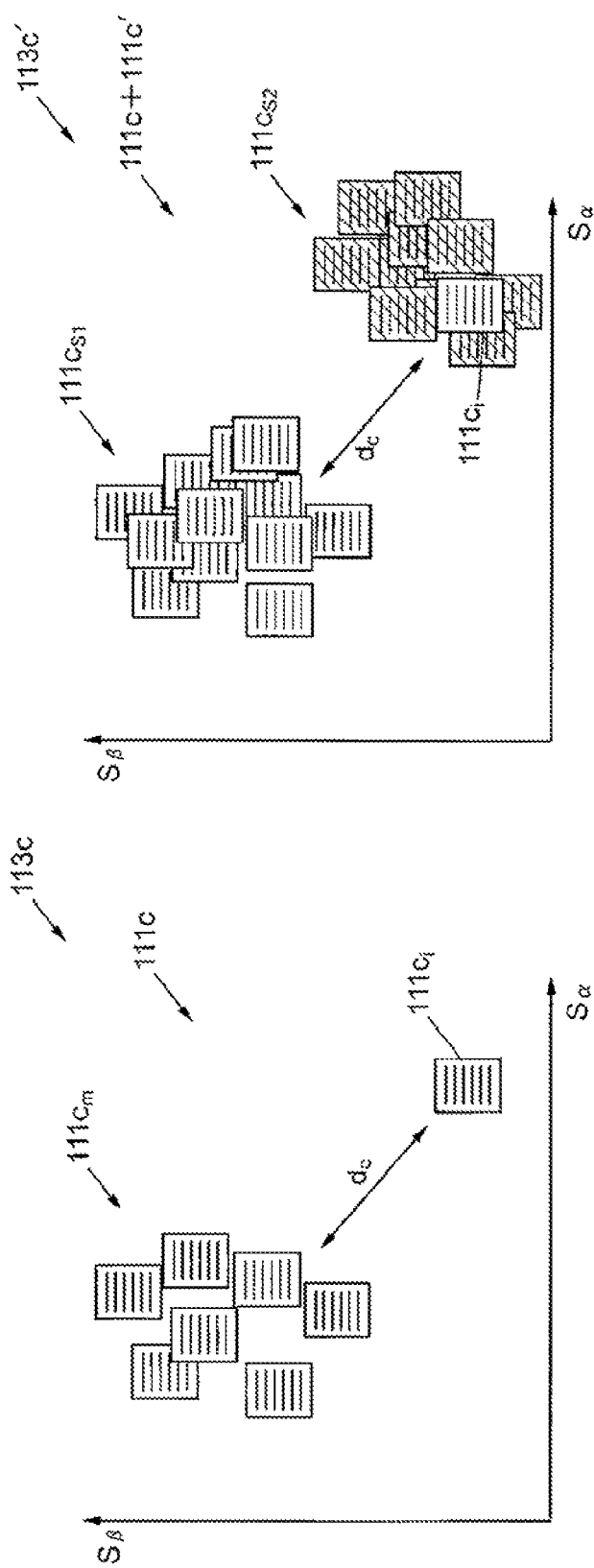

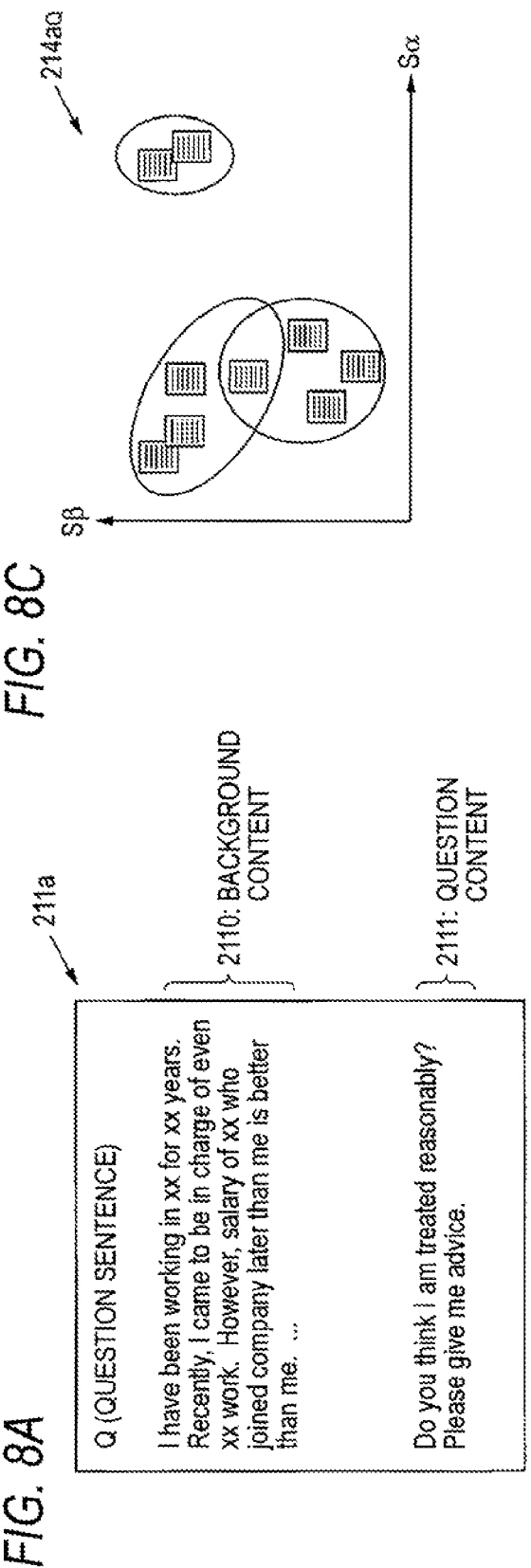

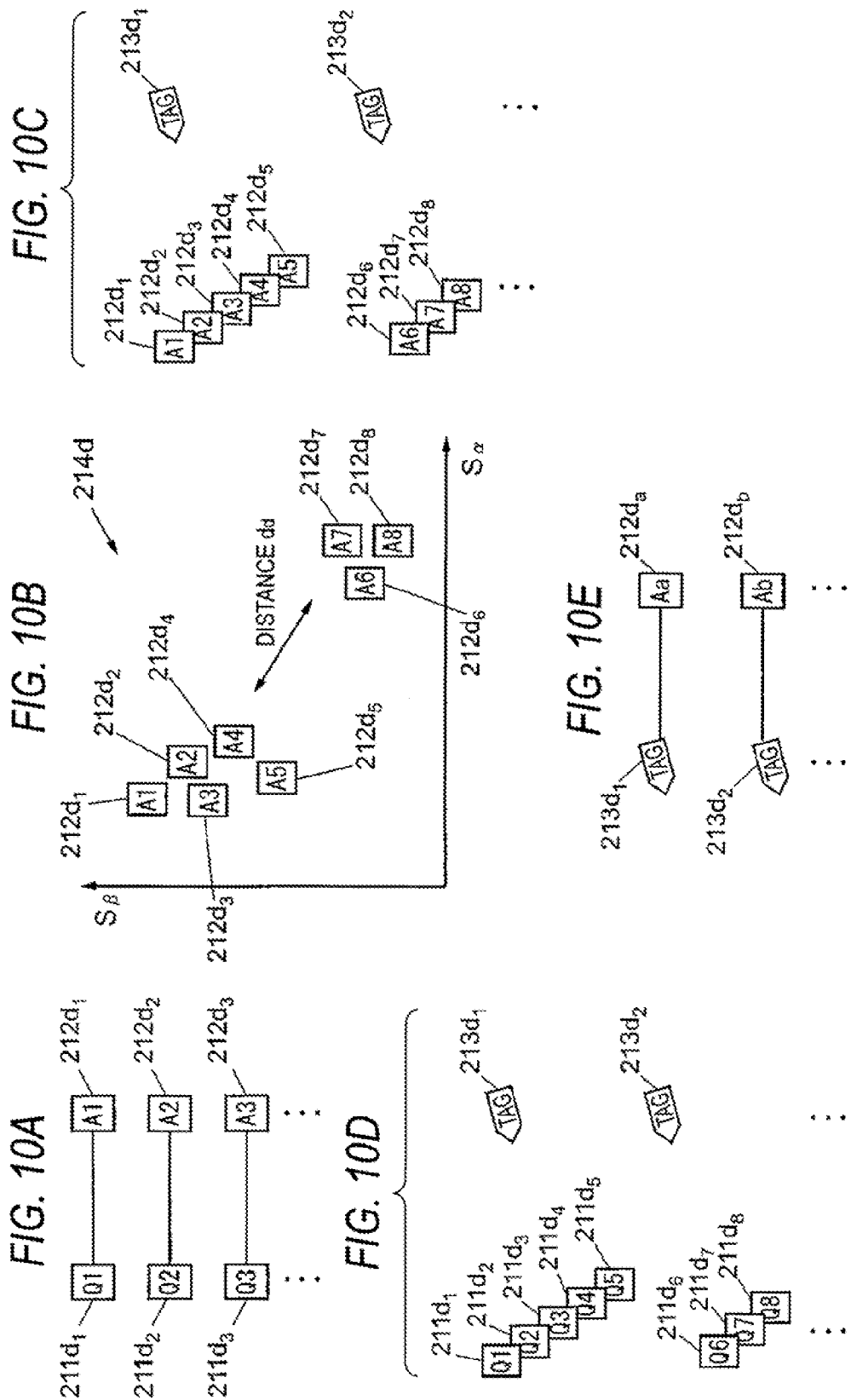

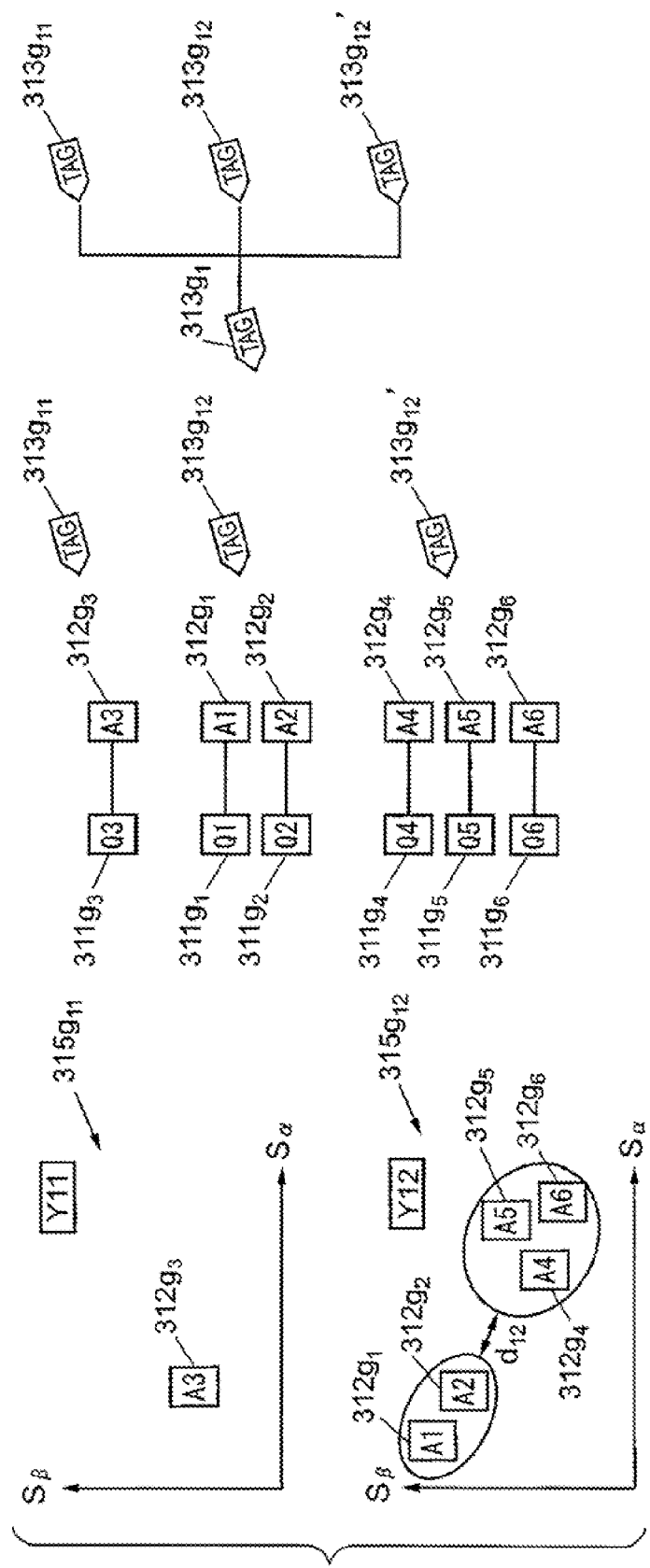

INFORMATION PROCESSING APPARATUS AND NON-TRANSITORY COMPUTER READABLE MEDIUM

CROSS-REFERENCE TO RELATED APPLICATIONS

This application is based on and claims priority under 35 U.S.C. 119 from Japanese Patent Application No. 2013-126383, filed on Jun. 17, 2013 and Japanese Patent Application No. 2013-203659, filed on Sep. 30, 2013.

BACKGROUND

Technical Field

The present invention relates to an information processing apparatus and a non-transitory computer readable medium.

SUMMARY

According to an aspect of the present invention, it provides a non-transitory computer readable medium storing a program causing a computer to execute a process for information processing, the process including: calculating a feature amount of each of document contents to which common attribute information is added; and generating distribution map information by plotting each of document contents in a feature amount space on the basis of the calculated feature amount.

BRIEF DESCRIPTION OF THE DRAWINGS

Exemplary embodiment(s) of the present invention will be described in detail based on the following figures, wherein:

FIGS. 3A and 3B are schematic diagrams for explaining an example of classifying operation;

FIGS. 4A to 4C are schematic diagrams for explaining an example of an operation of an information processing apparatus according to a second embodiment;

FIGS. 5A and 5B are schematic diagrams for explaining an example of an operation of an information processing apparatus according to a third embodiment;

FIGS. 6A and 6B are schematic diagrams for explaining another example of the operation of the information processing apparatus according to the third embodiment;

FIGS. 8A to 8D are schematic diagrams showing an example of the configuration of a question document content and an answer document content;

FIGS. 10A to 10E are schematic diagrams for explaining an example of classifying and learning operation of the information processing apparatus;

FIGS. 18A to 18E are schematic diagrams for explaining an example of an operation of an information processing apparatus according to a sixth embodiment.

DETAILED DESCRIPTION

Hereinafter, collecting similar document contents to form a set may be referred to as "classifying", and the set may be referred to as "class".

First Embodiment

Configuration of Information Processing Apparatus

Figure 1:
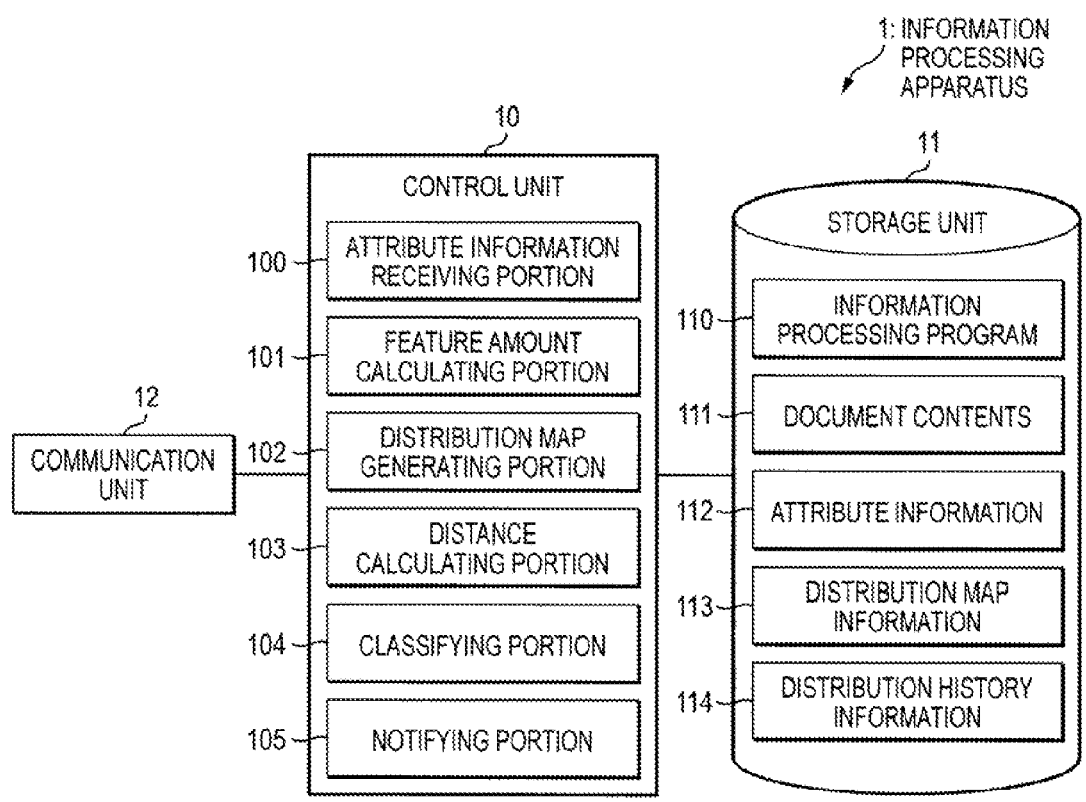
FIG. 1 is a block diagram showing an example of a configuration of an information processing apparatus according to a first embodiment.

FIG. 1 is a block diagram showing an example of a configuration of an information processing apparatus 1 according to a first embodiment of the present invention.

The information processing apparatus 1 includes: a control unit 10 that is formed of a central processing unit (CPU) or the like and controls each unit and executes various kinds of programs; a storage unit 11 as an example of a storage device that is formed of a recording medium, such as a hard disk drive (HDD) or a flash memory, and stores information; and a communication unit 12 that communicates with an external terminal through a network.

In addition, the information processing apparatus 1 is a server apparatus that receives a request from an external device connected through the communication unit 12 and a network and transmits a response to the request to the external device that is a source of the request.

The control unit 10 functions as an attribute information receiving portion 100, a feature amount calculating portion 101, a distribution map generating portion 102, a distance calculating portion 103, a classifying portion 104, a notifying portion 105, and the like by executing an information processing program 110 that will be described later.

The attribute information receiving portion 100 receives attribute information 112 including at least an attribute name, which is added to document content 111, in response to the attribute information adding request received from the outside. The attribute information 112 indicates a name of class of the document content 111. The document content 111 shows a content of a document. For example, the content may include question information relating to tax and answer information to the question information. The document content 111 may include text information transmitted by information communication such as an e-mail and a chat, information obtained by converting sound information into the text information, and information obtained by optically scanning a paper document or the like, for example.

In response to a document content classifying request received from the outside, the feature amount calculating portion 101 performs vector representation of the documents from the document contents 111, to which the common attribute information 112 is added, using a term frequency (TF-IDF), for example, and calculates feature amounts using multidimensional scaling (MDS). In addition, it is also possible to calculate the feature amounts using other methods.

The distribution map generating portion 102 generates distribution map information 113 by plotting the document contents 111 of the same class, that is, the document contents 111 to which the common attribute information 112 is added, in a feature amount space on the basis of the feature amounts calculated by the feature amount calculating portion 101. In addition, the dimension of the feature amount space depends on the number of types of the feature amount calculated by the feature amount calculating portion 101.

The distance calculating portion 103 calculates a distance in the feature amount space between the document content 111, to which the common attribute information 112 is added, on the basis of the feature amounts calculated by the feature amount calculating portion 101.

The classifying portion 104 determines whether or not each of the document contents 111 to which the common attribute information 112 is added is in a correct class on the basis of the distance in the feature amount space calculated by the distance calculating portion 103. When the classifying portion 104 determines one of the document contents 111 to which the common attribute information 112 is added is not in the correct class, the classifying portion 104 classify this document content 111 in to another class (as will hereinafter be described in detail).

The notifying portion 105 notifies a source of the document content classifying request of the distribution map information 113 generated by the distribution map generating portion 102 and/or the classifying result by the classifying portion 104.

The storage unit 11 stores the information processing program 110, the document content 111, the attribute information 112, the distribution map information 113, distribution history information 114, and the like.

The information processing program 110 is a program to make the control unit 10 operate as the portions 100 to 106 described above.

The distribution history information 114 is information obtained by recording the distribution map information 113 together with date and time information for a certain period.

In addition, the information processing apparatus 1 is a server apparatus or a personal computer, for example. However, it is also possible to use a mobile phone, a tablet terminal, and the like.

In addition, the information processing apparatus 1 may be configured to further include an operating unit and a display unit, so that the information processing apparatus 1 operates independently without using an external device.

(Operation of Information Processing Apparatus)

Next, an operation of the present embodiment will be divided into (1) Basic operation, (2) Distribution map generating operation, and (3) Classifying operation, and explanation of each operation will be given below.

(1) Basic Operation

First, in order to classify the document contents 111 of the storage unit 11, the user of the information processing apparatus 1 operates an operating unit of a terminal device (not shown) that is connected to the information processing apparatus 1 through a network so that an attribute name is input for adding the attribute information to the document contents 111.

Then, the attribute information receiving portion 100 displays an attribute information input field on the display unit of the terminal device, and receives an input of the attribute name. As an example, it is assumed that the attribute name of "tax" is input.

Then, the attribute information receiving portion 100 adds "tax", which is the attribute name input to the attribute information input field, to the document contents 111, and stores the "tax" in the storage unit 11 as the attribute information 112.

Then, the user requests the information processing apparatus 1 to classify the document content 111 in order to determine whether or not each of the document content 111 to which the attribute information 112 is added is in a correct class, that is, in order to determine whether or not each of the document contents 111 is added with correct attribute information 112.

In addition, not only can the user add the attribute information 112 to the document content 111, but also the attribute information 112 may be added to the document content 111 automatically by a machine.

(2) Distribution Map Generating Operation

Figure 2B:
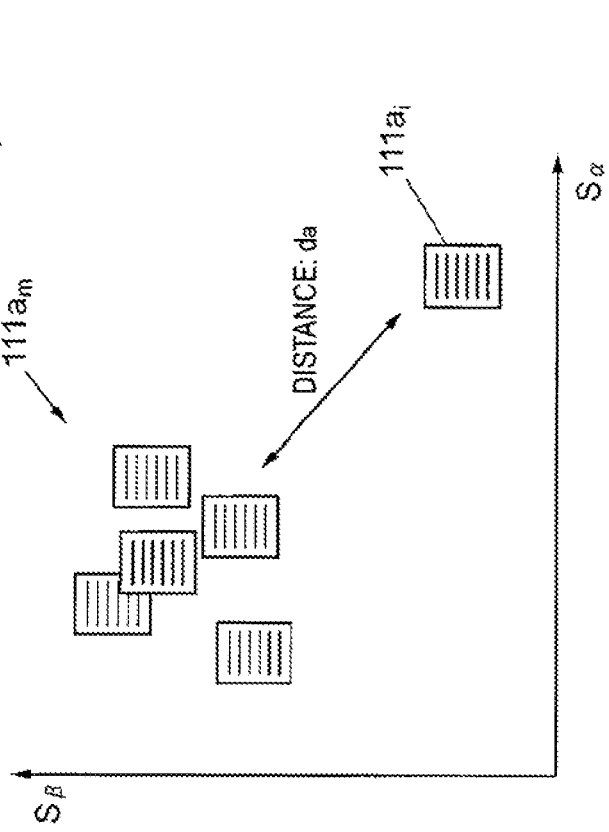
FIGS. 2A and 2B are schematic diagrams for explaining an example of distribution map generating operation.
Figure 2A:
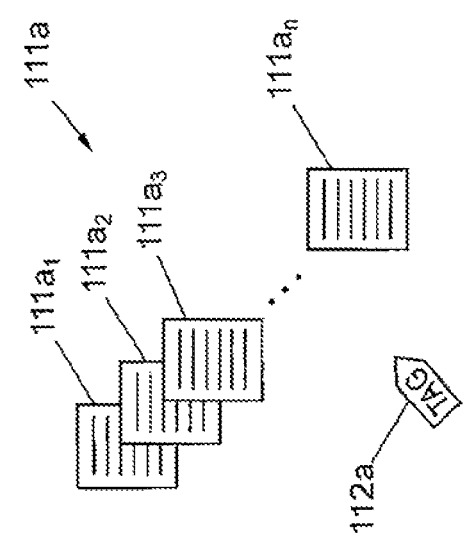

FIGS. 2A and 2B are schematic diagrams for explaining an example of the distribution map generating operation.

As shown in FIG. 2A, for example, "tax" as attribute information 112$a$ is added to document contents 111$a_1$ to 111$a_n$ in a set 111$a$ by the user. In the present embodiment, as shown in FIG. 2A and subsequent drawings, the attribute information is expressed as "tag". Type, category, industry, and so on are prepared for the attribute information 112$a$.

In response to the document content classifying request, the feature amount calculating portion 101 calculates the feature amount from each of the document contents 111$a_1$ to 111$a_n$ to which the common attribute information 112$a$ is added.

Then, as shown in FIG. 2B, the distribution map generating portion 102 generates the distribution map information 13 by plotting each of the document contents 111$a_1$ to 111$a_n$, to which the common attribute information 112 is added, in the feature amount space on the basis of the feature amount calculated by the feature amount calculating portion 101.

In addition, although the distribution map information 113 shows the distribution of the two-dimensional space for the sake of explanation, it is also possible to show the distribution of the n-dimensional space where n>2.

The distance calculating portion 103 calculates distances in the feature amount space between document contents 111$a_1$ to 111$a_n$, to which the common attribute information 112 is added, on the basis of the feature amounts calculated by the feature amount calculating portion 101. The distance $d_a$ shown in FIG. 2B is the average of the distance between the document content 111$a_i$ and each of the document contents in a set 111$a_m$ which excludes the document content 111$a_i$. In addition, the distance $d_n$ may be a distance between the document content 111$a_i$ and the document content in the set 111$a_m$, that is closest to the document content 111$a_i$ or may be a distance between the document content 111$a_m$, and the document content in the set 111$a_m$, that is farthest from the document content 111$a_i$, and may be approximately defined.

(3) Classifying Operation

FIGS. 3A and 3B are schematic diagrams for explaining an example of the classifying operation.

The following is to explain an operation subsequent to "(2) Distribution map generating operation", and this explanation will be added on the assumption that "tax" that is the common attribute information 112a is added to the document contents in the set $111a_m$ and the document content $111a_i$ by the user in "(2) Distribution map generating operation". Referring to the distribution map information 113 shown in FIG. 3A, the classifying portion 104 determines the document content having a distance equal to or greater than the threshold value $d_t$ set in advance, should be in a different class on the basis of the distance $d_a$ in the feature amount space. In other words, the classifying portion 104 determines attribute information other than "tax" corresponding to the common attribute information 112a should be added to the document content $111a_i$ on the basis of the distance $d_n$ in the feature amount space. Accordingly, the classifying portion 104 determines the document contents in the set $111a_m$ to which the common attribute information 112a is added, and the document content $111a_i$ to which attribute information different from the attribute information 112a is added should be in different classes.

Specifically, when the classifying result is $d_a > d_t$, the classifying portion 104 determines the document contents in the set $111a_m$ and the document content $111a_i$ should be in different classes. The classifying portion 104 deletes the attribute information 112a from the document content $111a_i$, as shown in FIG. 3B. This means the document content $111a_i$ is in a complementary set with respect to the set $111a_m$. In other word, since the attribute information 112a is not correct for the document content $111a_i$, the document content $111a_i$ is classified into a different class. The classifying portion 104 may notify the user that the attribute information 112a might be added incorrectly, as the classifying result, through the notifying portion 105 to be described below without deleting the attribute information 112a. In addition, the classifying portion 104 may estimate that attribute information which is added to another document content having a short distance from the document content $111a_i$ in the feature amount space, is attribute information that should be added again to the document content $111a_i$ using the history of the past and the like. And, instead of the attribute information 112a, the classifying portion 104 adds the estimated attribute information to the document content $111a_i$ from which the attribute information 112a has been deleted. Here, "adding again" refers to "adding other attribute information different from attribute information added in advance instead of the attribute information added in advance".

The notifying portion 105 notifies the user, who is a request source of the document content classifying request, of the distribution map information 113a generated by the distribution map generating portion 102 and/or the classifying result of the classifying portion 104.

For example, the distribution map information 113a may be displayed on the display unit of the user's terminal, and the document content $111a_i$ having a distance equal to or greater than the threshold value $d_t$ set in advance may be highlighted as the classifying result and it may be displayed with a message that the attribute information 112a has been deleted from the document content $111a_i$.

Effect of the First Embodiment

According to the embodiment described above, the feature amounts of the document contents in the set 111a to which the attribute information 112a is added are calculated, and the attribute information 112a added to one of the document contents is deleted when a distance of the one of the document contents in the feature amount space is equal to or greater than the threshold value set in advance. Therefore, by indicating the document content from which the attribute information 112a has been deleted, it can be presented to the user that the attribute information 112a added to the document content is incorrect.

In addition, when there is a document content having a distance in the feature amount space equal to or greater than the threshold value set in advance, the user is notified of the presence of such document content. Therefore, it is possible to present information allowing the user to determine whether or not the attribute information 112a added to the document content is correct.

When there is a document content having a distance in the feature amount space equal to or greater than the threshold value set in advance, the attribute information of the document content is added again. Therefore, by indicating the document content to which the attribute information has been added again, it can be presented to the user that the attribute information 112a added to the document content is incorrect.

In short, according to the embodiment described above, it is possible to present information allowing the user to determine whether or not the attribute information 112a added to the document contents is correct. In addition, in the present embodiment, when there is a document content having a distance equal to or greater than the threshold value set in advance, the attribute information is deleted, and the user is notified of the situation or attribute information is added again. However, only when the distance between the document contents is relatively larger in relation to the distance between other document contents, the attribute information may be deleted, and the user may be notified of the situation or attribute information may be added again.

In addition, the same effect can be obtained even if an operation is performed when there is a document content having a distance greater than the threshold value set in advance, which excludes a case that the distance equals to the threshold value set in advance as the condition of determination. In addition, it may also be notified that attribute information added to the document content having a distance less than the threshold value set in advance is correct.

Second Embodiment

A second embodiment is different from the above in that the distribution map information described in the first embodiment is generated for plural users and then the plurality of pieces of generated distribution map information are combined and classified.

FIGS. 4A to 4C are schematic diagrams for explaining an example of the operation of the information processing apparatus 1 according to the second embodiment.

As shown in FIG. 4A, a case will be described in which common attribute information 112a is added to sets $111a_A$ to $111a_C$ of the document contents by plural users A to C. In addition, since the adding operation is the same as "(1) Basic operation" in the first embodiment, explanation thereof will be omitted.

Next, as shown in FIG. 4B, distribution map information $113_A$ to $113_C$ in the feature amount space is generated for the sets $111a_A$ to $111a_C$ of the document contents. In addition, since the generation of the distribution map information $113_A$ to $113_C$ is the same as "(2) Distribution map generating operation" in the first embodiment, explanation thereof will be omitted.

When the distribution map information $113_A$ to $113_C$ is generated, if the document contents $111a_{Ai}$ to $111a_{Ci}$ has distances from the sets $111a_{Am}$ to $111a_{Cm}$ equal to or greater than the threshold value $d_t$ set in advance, the document contents $111a_{Ai}$ to $111a_{Ci}$ are classified into different classes.

Then, the distribution map generating portion 102 combines the distribution map information $113_A$ to $113_C$ to obtain distribution map information $113_{A+B+C}$ as shown in FIG. 4C. Accordingly, the document contents $111a_{Ai}$ to $111a_{Ci}$ are located at a shorter distance from a set $111a_{A+B+C}$ of other document contents in the feature amount space than the threshold value $d_t$ set in advance.

Effect of the Second Embodiment

According to the embodiment described above, when attribute information is added for the document contents separately by plural users, for example, the distribution of the document contents in the feature amount space is combined. Therefore, for a document content that might be determined to have been classified incorrectly when the number of document contents is small, the combination result helps to determine the class for the document content is not incorrect. In addition, a document content having a distance from other document contents equal to or greater than $d_t$ even after being combined is classified as a document content that should be in a different class as indicated by the original determination.

In addition, in the second embodiment described above, the classifying has been performed for the distribution map information $113_{A+B+C}$ obtained by combining the distribution map information $113_A$ to $113_C$. However, the present invention is not limited thereto. When the distribution map information $113_A$ to $113_C$ is generated, if the distances between the document contents $111a_{Ai}$ to $111a_{Ci}$ and the sets $111a_{Ai}$ to $111a_{Cm}$ are equal to or greater than the threshold value $d_t$ set in advance, the document contents $111a_{Ai}$ to $111a_{Ci}$ are firstly classified as document contents that should be in different classes, and classifying may be performed again for the distribution map information $113_{A+B+C}$ obtained by combining the distribution map information $113_A$ to $113_C$. Also in this case, the same effect as in the second embodiment can be obtained.

Third Embodiment

A third embodiment is different from the above in that the distribution map information described in the first embodiment is generated and temporally stored and classifying is performed according to the history of the distribution map information.

FIGS. 5A and 5B are schematic diagrams for explaining an example of the operation of the information processing apparatus 1 of the third embodiment.

As shown in FIG. 5A, a case will be described in which the distribution map generating portion 102 generates distribution map information $113b$ in the feature amount space for a set $111b$ of document contents. In addition, since the generation of the distribution map information $113b$ is the same as "(2) Distribution map generating operation" in the first embodiment, explanation thereof will be omitted.

In the distribution map information $113b$, a document content $111b_i$ is assumed to be separated from a set $111b_m$ of other document contents by a distance $d_b$ equal to or greater than the threshold value $d_t$. In normal cases, the classifying portion 104 deletes attribute information from the document content $111b_i$ when the classifying result is $d_b > d_t$. In the present embodiment, however, the attribute information is not deleted from the document content $111b_i$ for the distribution map information $113b$ firstly generated. The notification indicating that the adding of the attribute information for the document content $111b_i$ is incorrect at this timing may be executed.

Then, when a document content classifying request for a set $111b'$ of document contents (set of the document contents indicated by hatching in FIG. 5B), to which the common attribute information as the set $111b$ of the document contents is added, is received, the distribution map generating portion 102 generates distribution map information $113b'$ in the feature amount space for a set obtained by combining the sets $111b$ and $111b'$ of the document contents as shown in FIG. 5B.

In the distribution map information $113b'$, the document content $111b_i$ is not separated from a set $111b_{ms}$ of the other document contents by the distance $d_b$ equal to or greater than the threshold value $d_t$. Accordingly, the classifying portion 104 does not delete the attribute information from the document content $111b_i$.

FIGS. 6A and 6B are schematic diagrams for explaining another example of the operation of the information processing apparatus 1 of the third embodiment.

As shown in FIG. 6A, a case will be described in which the distribution map generating portion 102 generates distribution map information $113c$ in the feature amount space for a set $111c$ of document contents to which the common attribute information is added. In addition, since the generation of the distribution map information $113c$ is the same as "(2) Distribution map generating operation" in the first embodiment, explanation thereof will be omitted.

In the distribution map information $113c$, a document content $111c_i$ is assumed to be separated from a set $111c_m$ of other document contents by a distance $d_c$ equal to or greater than the threshold value $d_t$. In normal cases, the classifying portion 104 deletes attribute information from the document content $111c_i$ when the classifying result is $d_c > d_t$. In the present embodiment, however, the attribute information is not deleted from the document content $111c_i$ for the distribution map information $113c$ firstly generated. The notification indicating that the adding of the attribute information for the document content $111c_i$ is incorrect at this timing may be executed.

Then, when a document content classifying request for a set $111c'$ of document contents (set of the document contents indicated by hatching in FIG. 6B), to which the common attribute information as the set $111c$ of the document contents is added, is received, the distribution map generating portion 102 generates distribution map information $113c'$ in the feature amount space for a set obtained by combining the sets $111c$ and $111c'$ of the document contents as shown in FIG. 6B.

In the distribution map information $113c'$, the document content $111c_i$ is separated from a set $111c_{S1}$ of other document contents by the distance $d_c$ equal to or greater than the threshold value $d_t$, but is not separated from a set $111c_{S2}$ that is newly generated by the threshold value $d_t$ or more. In addition, the sets $111c_{S1}$ and $111c_{S2}$ are separated from each other by the threshold value $d_t$ or more. Therefore, the classifying portion 104 determines that new attribute information, which is different from the attribute information corresponding to the set $111c_{S1}$, is to be added to the set $111c_{S2}$ of the document contents including the document content $111c_i$.

When the classifying portion 104 determines that attribute information, which is different from the attribute information corresponding to the set $111c_{S1}$, is to be added to the set $111c_{S2}$ of the document contents including the document content $111c_i$, the notifying portion 105 may notify the user, who is a request source of the document content classifying request, in order to propose to add new attribute information to the set $111c_{S2}$ of the document contents.

In addition, the classifying portion 104 does not determine whether or not to delete the attribute information before the document content classifying request is received twice as described in FIGS. 5A to 6B, but determines whether or not to delete the attribute information when the document content classifying request is received twice. However, the classifying portion 104 may determine whether or not to delete the attribute information when the document content classifying request is received n times where n>2. Alternatively, instead of the number of times, the classifying portion 104 may determine whether or not to delete the attribute information when a certain period of time has passed. As examples of "when a certain period of time has passed". "when a year has passed" and "every season" may be mentioned. In addition, "when an event set in advance occurs" may be set as the conditions. As an example of the event set in advance, "when a set of a certain number or more of document contents is stored" may be mentioned. In addition, the determination regarding whether or not to delete the attribute information may be also performed when instructed by the user.

In addition, instead of the determination of the classifying portion 104, the notifying portion 105 may present the user a temporal change in the distribution map information using animation or the like so that the user determines whether or not to add the attribute information.

Effect of the Third Embodiment

According to the embodiment described above, plural distributions of document contents in the feature amount space generated temporally are combined. Therefore, for a document content classified incorrectly, it is possible to propose a new class via the combination result.

Fourth Embodiment

A fourth embodiment is different from the first embodiment in that the document content is replaced with a combination of a question document content which is a question and an answer document content that is an answer to the question. In the fourth embodiment, the distribution map information described in the first embodiment is generated and classified for the answer document contents, and then the question document contents are classified using the classifying result and learning is performed according to the classifying result of the question document contents. In addition, an answer document content corresponding to the question document content is estimated using the learning result.

(Configuration of Information Processing Apparatus)

Figure 7:
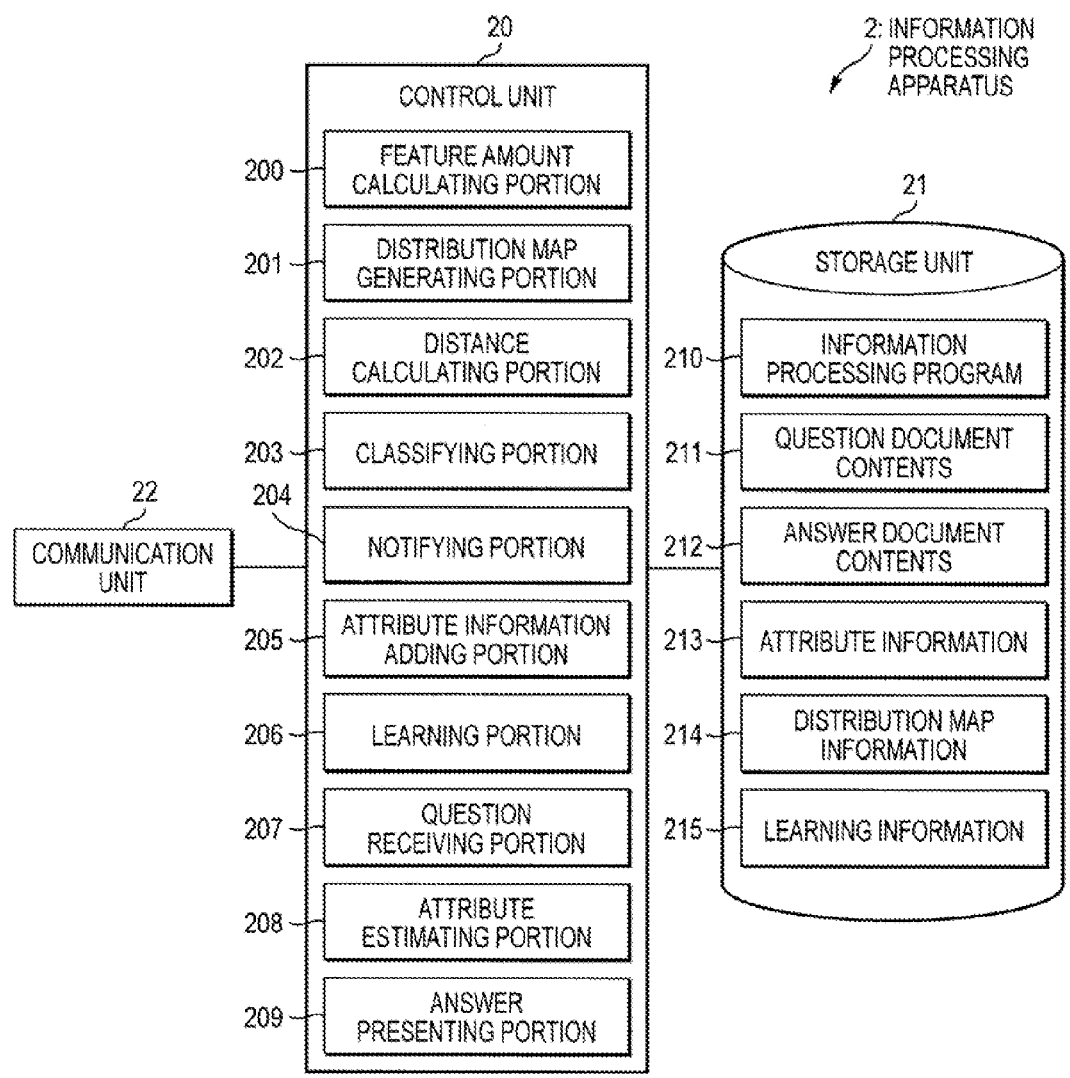
FIG. 7 is a block diagram showing an example of a configuration of an information processing apparatus according to a fourth embodiment.

FIG. 7 is a block diagram showing an example of the configuration of an information processing apparatus 2 according to the fourth embodiment of the present invention.

The information processing apparatus 2 includes: a control unit 20 that is formed of a CPU or the like and that controls each unit and executes various kinds of programs; a storage unit 21 as an example of a storage device that is formed of a recording medium, such as an HDD or a flash memory, and that stores information; and a communication unit 22 that communicates with an external terminal through a network.

In addition, the information processing apparatus 2 is a server apparatus that receives a request from an external device connected through the communication unit 22 and a network and transmits a response to the request to the external device that is a source of the request.

The control unit 20 functions as a feature amount calculating portion 200, a distribution map generating portion 201, a distance calculating portion 202, a classifying portion 203, a notifying portion 204, an attribute information adding portion 205, a learning portion 206, a question receiving portion 207, an attribute estimating portion 208, an answer presenting portion 209, and the like by executing an information processing program 210 that will be described later.

In response to a classifying request of question document contents 211, the feature amount calculating portion 200 performs vector representation of the answer document contents 212 using the term frequency (TF-IDF), for example, and calculates the feature amounts using the multidimensional scaling (MDS). In addition, it is also possible to calculate the feature amounts using other methods.

Here, the question document content 211 includes text information in the form of questions, and is generated by the user who asks a question (hereinafter, referred to as a "questioner"). For example, it is possible to use text information transmitted by information communication such as an e-mail and a chat, information obtained by converting sound information into the text, and information obtained by optically scanning a paper document or the like. In addition, the answer document content 212 is generated by the user who answers the question (hereinafter, referred to as an "answerer"). The question document content 211 and the answer document content 212 are in the relationship of the answer to the question, and are a set of document contents corresponding to each other in a one-to-one manner. That is, the answerer who has generated the answer document content 212 associates the answer document content 212 with the question document content 211.

The distribution map generating portion 201 generates distribution map information 214 by plotting each of the answer document contents 212 in the feature amount space on the basis of the feature amount calculated by the feature amount calculating portion 200. In addition, the dimension of the feature amount space depends on the number of types of the feature amount calculated by the feature amount calculating portion 200.

The distance calculating portion 202 calculates a distance in the feature amount space between the answer document contents 212 on the basis of the feature amounts calculated by the feature amount calculating portion 200.

When the distance in the feature amount space calculated by the distance calculating portion 202 is equal to or greater than a distance set in advance, the classifying portion 203 classifies the answer document contents 212 to which different attribute information 213 should be added.

The notifying portion 204 notifies a request source of the classifying request of the answer document contents 212 classified by the classifying portion 203 and/or the question document contents 211 corresponding to the answer document contents 212.

The attribute information adding portion 205 receives the attribute information 213 to be added to the answer document contents 212 in the same class and/or the question document contents 211 in the same class, in response to an attribute information adding request received from the outside. The attribute information 213 includes at least an attribute name. The attribute information 213 indicates a name of class.

The learning portion 206 performs learning using the question document contents 211 to which the attribute information 213 is added, thereby generating learning information 215. In addition, the learning herein is machine learning using a support vector machine (SVM), for example.

The question receiving portion 207 receives the question document content 211 (new question document content) from the outside through the communication unit 22.

The attribute estimating portion 208 estimates attribute information added to the question document content 211, which has been received from the outside by the question receiving portion 207, using the learning information 215.

The answer presenting portion 209 presents the answer document content 212 having the same attribute information, which is estimated by the attribute estimating portion 208, to the transmission source of the question document content 211.

The storage unit 21 stores the information processing program 210, the question document content 211, the answer document content 212, the attribute information 213, the distribution map information 214, the learning information 215, and the like.

The information processing program 210 is a program to make the control unit 20 operate as the portions 200 to 209 described above.

In addition, the information processing apparatus 2 is a server apparatus or a personal computer, for example. However, it may be a mobile phone, a tablet terminal, and the like.

In addition, the information processing apparatus 2 may be configured to further include an operating unit and a display unit, so that the information processing apparatus 2 operates independently without using an external device.

(Configuration of Question Document Content and Answer Document Content)

FIGS. 8A to 8D are schematic diagrams showing an example of the configuration of the question document content 211 and the answer document content 212.

A question document content 211a shown in FIG. 8A is an example of the question document content 211. For example, the question document content 211a is not asked from an expert who has exact knowledge of the field to be asked but asked from a general user (questioner) who does not have sufficient knowledge of the field to be asked. The question document content 211a includes the background content 2110 that is premise information of the question, information derived from the question, or the like (that may be not relevant to the question in essence) and the question content 2111 that is the essential content of the question. In addition, the background content 2110 is not always included. However, considering the question document content 211a is a question from the general user, the background content 2110 is often included. In addition, the question content 2111 is the essential content of the question. However, some users often fail to point out the exact content.

In the above assumptions, when the feature amount calculating portion 200 calculates feature amount for the question document content 211a and the distribution map generating portion 201 generates distribution map information $214a_Q$ shown in FIG. 8C by the same operation as in the first embodiment, i) words included in the background content 2110 or ii) words of the question content 2111 that is not the exact content influence the feature amount extracted from the question document content 211a. Accordingly, the classifying result of the question document contents 211a is not necessarily ideal.

On the other hand, an answer document content 212a shown in FIG. 8B is generated by the expert or the like (answerer) who has exact knowledge of the field to be answered. The answer document content 212a includes the answer content 2120 that is the content of the answer to the essential content of the question.

In the above assumptions, when the feature amount calculating portion 200 calculates feature amount for the answer document content 212a and the distribution map generating portion 201 generates distribution map information $214a_A$ shown in FIG. 8D by the same operation as in the first embodiment, exact words are included in the answer content 2120. Accordingly, compared with the distribution map information $214a_Q$, the classifying result of the answer document contents 212a is ideal in many cases.

In summary, the fourth embodiment uses the characteristics of the question document content 211 and the answer document content 212 described above and performs classifying of the question document content 211 using the corresponding answer document content 212.

Other characteristics of the question document content 211 and the answer document content 212 will be further described below.

FIGS. 9A to 9D are schematic diagrams for explaining the features of the question document content 211 and the answer document content 212.

Figure 9C:
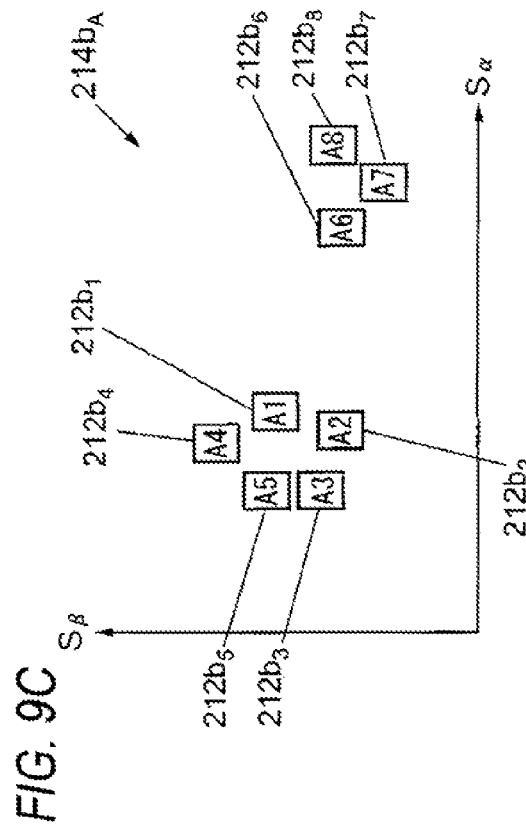
FIGS. 9A to 9D are schematic diagrams for explaining features of question document contents and answer document contents.
Figure 9D:
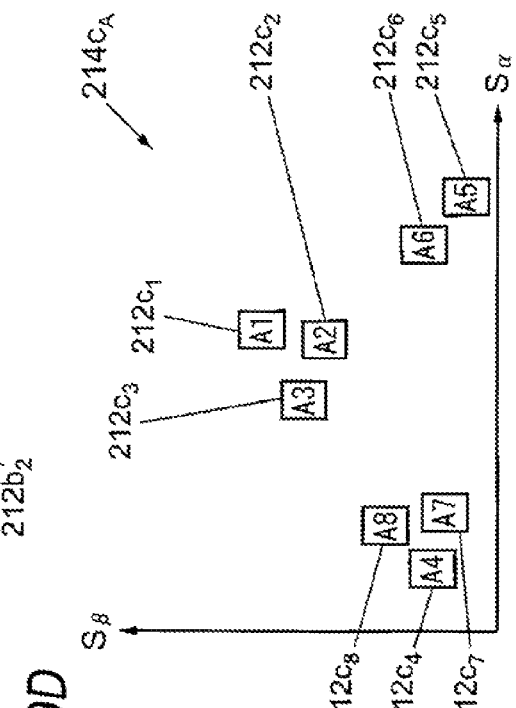
Figure 9A:
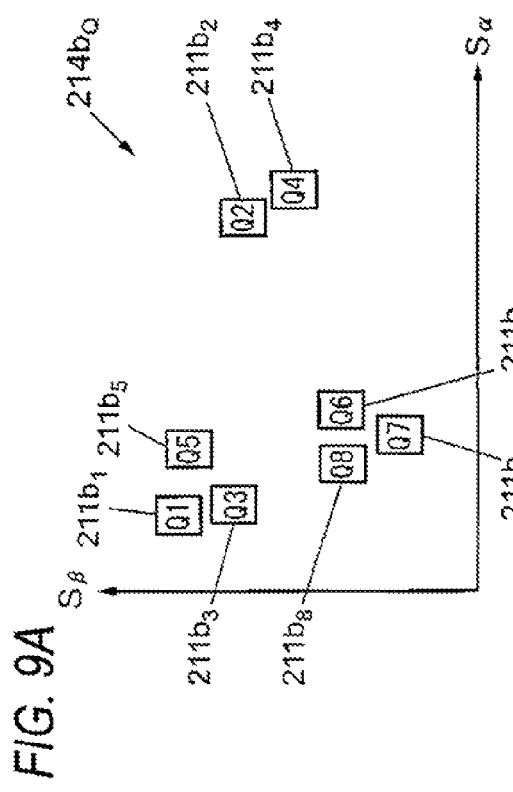

Even if question document contents $211b_1$, $211b_3$, and $211b_5$ and question document contents $211b_2$ and $211b_4$ are classified into different classes as shown in distribution map information $214b_Q$ shown in FIG. 9A, answer document contents $212b_1$, $212b_3$, and $212b_5$ and answer document contents $212b_2$ and $212b_4$ may be classified into the same class as shown in distribution map information $214b_A$ shown in FIG. 9C. That is, this indicates that answers of the similar content can correspond to different questions.

Figure 9B:
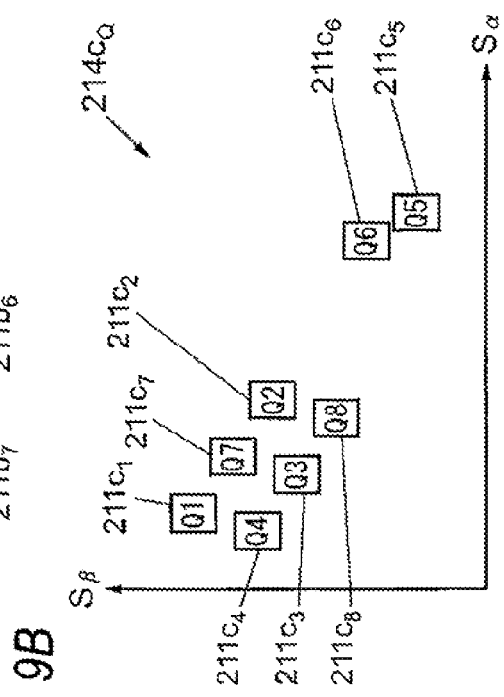

On the other hand, even if question document contents $211c_1$, $211c_2$, $211c_3$, $211c_4$, $211c_7$, and $211c_8$ are classified into the same class as shown in distribution map information $214c_Q$ shown in FIG. 9B, answer document contents $212c_1$, $212c_2$, and $212c_3$ and answer document contents $212c_4$, $212c_7$, and $212c_8$ may be classified into different classes as shown in distribution map information $214c_A$ shown in FIG. 9D. That is, this indicates that answers of the different content can correspond to similar questions.

In both the example shown in FIGS. 9A and 9C and the example shown in FIGS. 9B and 9D described above, the appropriate answer document content 212 can be presented by classifying the question document contents 211 on the basis of the classifying of the answer document contents 212.

(Operation of Information Processing Apparatus)

Then, the operation of the present embodiment will be divided into (1) classifying and learning operation and (2) Estimating operation, and explanation of each operation will be given below.

(1) Classifying and Learning Operation

Figure 12:
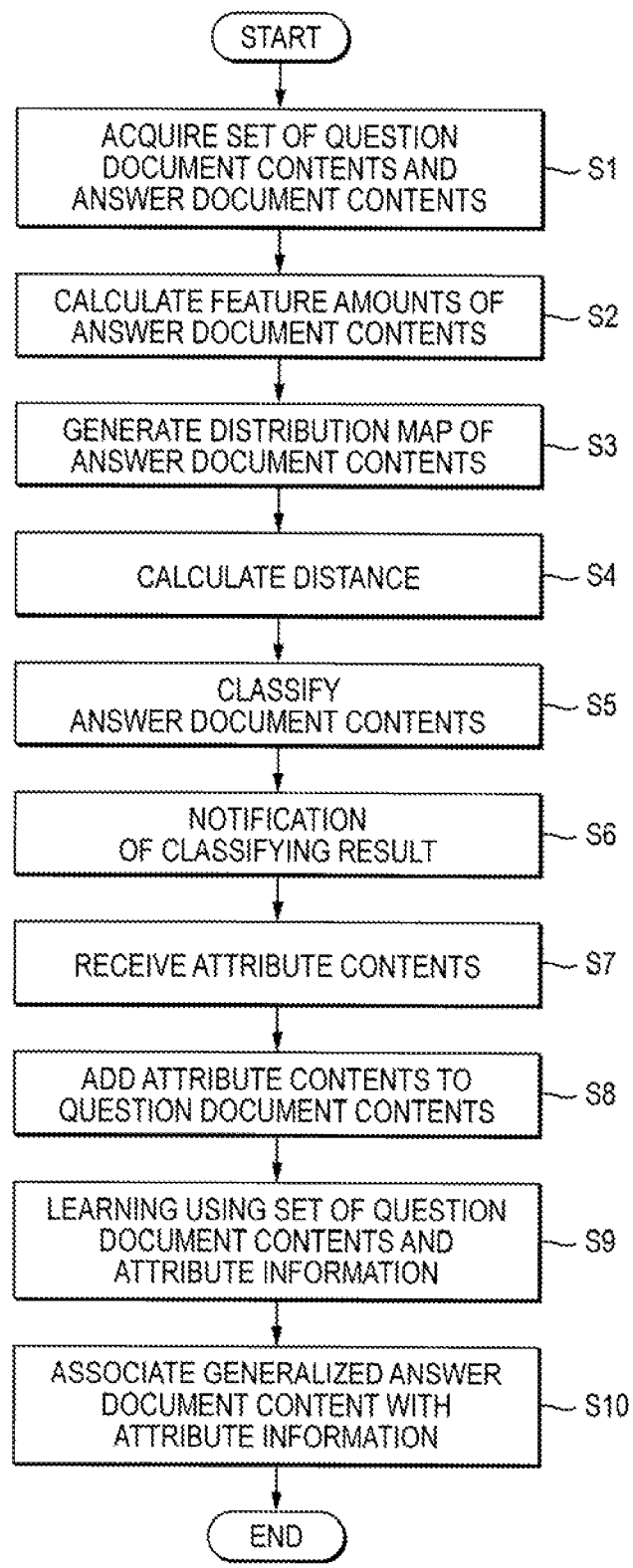
FIG. 12 is a flow chart for explaining an example of the classifying and learning operation of the information processing apparatus.

FIGS. 10A to 10E are schematic diagrams for explaining an example of the classifying and learning operation of the information processing apparatus 2. FIG. 12 is a flow chart for explaining an example of the classifying and learning operation of the information processing apparatus 2.

First, in order to classify question document contents $211d_1$, $211d_2$, $211d_3$, . . . shown in FIG. 10A and add attribute information to the question document contents $211d_1$, $211d_2$, $211d_3$, . . . , the user who manages the information processing apparatus 2 (hereinafter, referred to as a "manager") operates an operating unit of a terminal device (not shown), which is connected to the information processing apparatus 2 through a network, in order to firstly classify corresponding answer document contents $212d_1$, $212d_2$, $212d_3$, . . . . In addition, the manager may be an answerer.

According to the operation details of the manager, the information processing apparatus 2 acquires a set of the question document contents $211d_1$, $211d_2$, $211d_3$, . . . and the answer document contents $212d_1$, $212d_2$, $212d_3$, . . . , which are associated with each other, from the storage unit 21 (S1).

Then, the feature amount calculating portion 200 calculates the feature amount of the answer document contents $212d_1$, $212d$, $212d_3$, . . . (S2).

Then, as shown in FIG. 108, the distribution map generating portion 201 generates distribution map information $214d$ by plotting each of the answer document contents $212d_1$, $212d_2$, $212d_3$, . . . in the feature amount space on the basis of the feature amount calculated by the feature amount calculating portion 200 (S3).

Then, the distance calculating portion 202 calculates a distance $d_d$ in the feature amount space between the answer document contents 212 on the basis of the feature amounts calculated by the feature amount calculating portion 200 (S4).

When the distance in the feature amount space calculated by the distance calculating portion 202 is equal to or greater than a distance set in advance, as shown in FIG. 10C, the classifying portion 203 classifies the answer document contents $212d_1$ to $212d_5$ and the answer document contents $212d_6$ to $212d_8$ to which different pieces of attribute information 213 should be added (S5).

The notifying portion 204 notifies the terminal device, which is a request source of the classifying request, of the answer document contents $212d_1$ to $212d_5$ and the answer document contents $212d_6$ to $212d_8$ classified by the classifying portion 203 (S6).

The user of the information processing apparatus 2 checks the content sent to the terminal device, and performs an operation to add attribute information $213d$, and attribute information $213d_2$ to the answer document contents $212d_1$ to $212d_5$ and the answer document contents $212d_6$ to $212d_8$, respectively.

The attribute information adding portion 205 receives an attribute information adding request from the terminal device (S7), and adds the attribute information $213d_1$ to the answer document contents $212d_1$ to $212d_5$ and the attribute information $213d_2$ to the answer document content $212d_6$ to $212d_8$ as shown in FIG. 10C in response to the attribute information adding request (S8).

In addition, as shown in FIG. 10D, the attribute information adding portion 205 similarly adds the attribute information $213d_1$ and the attribute information $213d_2$ to the question document contents $211d_1$ to $211d_5$ and the question document contents $211d_6$ to $211d_8$ corresponding to the answer document content $212d_1$ to $212d_5$ and the answer document content $212d_6$ to $212d_5$ (S8).

Then, the learning portion 206 generates the learning information 215 by performing learning using the question document contents $211d_1$ to $211d_5$ and the question document contents $211d_6$ to $211d_8$ to which the attribute information $213d_1$ and the attribute information $213d_2$ are added as shown in FIG. 10D (S9).

Then, as shown in FIG. 10E, on the basis of the operation of the manager, answer document content $212d_a$ obtained by generalizing the answer document contents $212d_1$ to $212d_5$ and answer document content $212d_b$ obtained by generalizing the answer document contents $212d_6$ to $212d_8$ are generated and associated with the attribute information $213d_1$ and the attribute information $213d_2$, respectively. In addition, the answer document content $212d_a$ and the answer document content $212d_b$ may be automatically generated by extracting the common words from the answer document contents $212d_1$ to $212d_5$ and the answer document contents $212d_6$ to $212d_8$.

(2) Estimating Operation

Figure 11A:
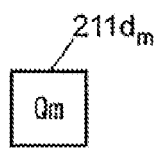
FIGS. 11A to 11C are schematic diagrams for explaining an example of estimating operation of the information processing apparatus.
Figure 11B:
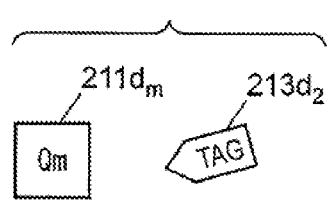
Figure 11C:
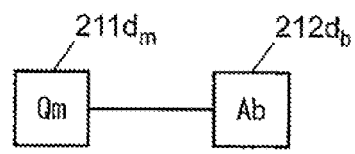
Figure 13:
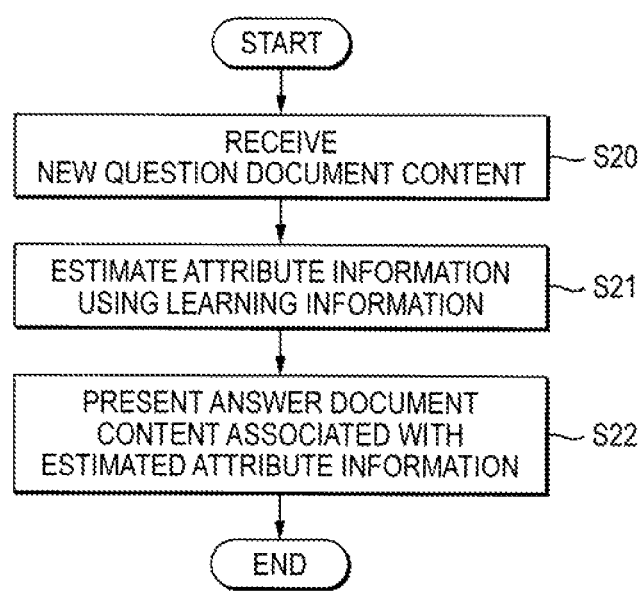
FIG. 13 is a flow chart for explaining an example of the estimating operation of the information processing apparatus.

FIGS. 11A to 11C are schematic diagrams for explaining an example of the estimating operation of the information processing apparatus 2. FIG. 13 is a flow chart for explaining an example of the estimating operation of the information processing apparatus 2.

First, in order to ask a question to the information processing apparatus 2, a questioner generates a question document content $211d_m$ (new question document content) shown in FIG. 11A, and transmits the question document content $211d_m$ to the information processing apparatus 2 from another terminal device (not shown) connected to the information processing apparatus 2 through a network.

The question receiving portion 207 of the information processing apparatus 2 receives the question document content $211d_m$ from the questioner (S20). In addition, the question document content $211d_m$ is not associated with the answer document content 212.

Then, the attribute estimating portion 208 estimates attribute information to be added to the question document content $211d_m$ using the learning information 215, and adds the attribute information $213d_2$ as shown in FIG. 11B (S21).

Then, the answer presenting portion 209 presents the answer document content $212d_b$ associated with the attribute information $213d_2$ by displaying the answer document content $212d_b$ as an answer to the question document content $211d_m$ on the terminal device that the questioner uses, as shown in FIG. 11C (S22). In addition, instead of being directly displayed on the terminal device that the questioner uses, the answer document content $212d_b$ may be presented to the questioner after being displayed on the terminal device that the answerer uses so that the answerer checks or modifies the answer document content $212d_b$.

Effect of the Fourth Embodiment

According to the embodiment described above, the corresponding question document content 211 is classified using the answer document content 212 having the answer content 2120 that is the content of the answer to the essential content of the question. Therefore, even if the question document content 211 does not necessarily have the essential content of the question, it is possible to obtain the classifying result that is not influenced by the feature amount in which words included in the background content 2110 of the question document content 211 or words of the question content 2111 that is not exact content are extracted, compared with a case where the question document content 211 is directly classified.

In addition, the attribute information 213 is added to the question document content 211 classified by the answer document content 212, the learning information 215 is generated by performing learning for a set of question document contents 211 and attribute information 213 by the learning portion 206, and the answer document content 212 to be presented is specified by attribute estimation using the learning information 215. Therefore, it is possible to present an answer according to the classifying of the answer document contents 212.

Fifth Embodiment

In a fifth embodiment, a determination content as a point of view when the answerer generates answer document content is added as an answer to the question document content of the fourth embodiment. In addition, an answer document content is classified using the determination content, and attribute information is added according to the classifying.

(Configuration of Information Processing Apparatus)

Figure 14:
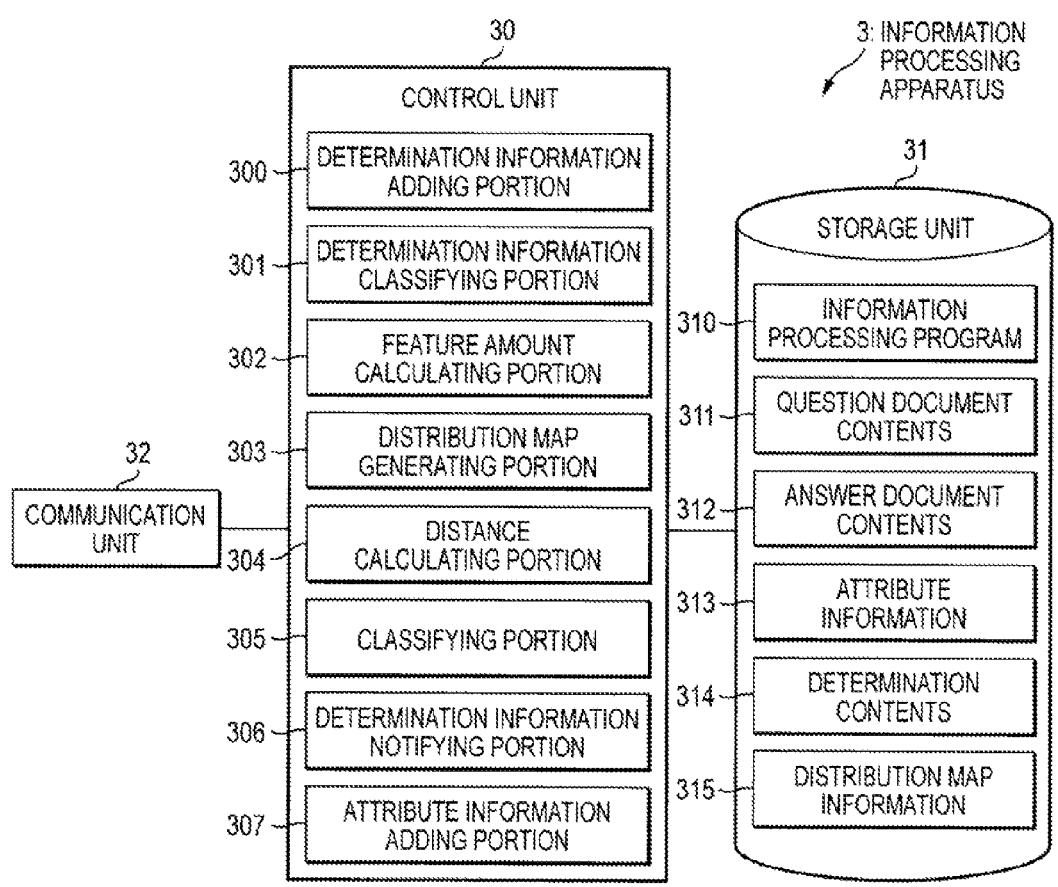
FIG. 14 is a block diagram showing an example of a configuration of an information processing apparatus according to a fifth embodiment.

FIG. 14 is a block diagram showing an example of the configuration of an information processing apparatus 3 according to the fifth embodiment of the present invention.

The information processing apparatus 3 includes: a control unit 30 that is formed of a CPU or the like and that controls each unit and executes various kinds of programs; a storage unit 31 as an example of a storage device that is formed of a recording medium, such as an HDD or a flash memory, and that stores information; and a communication unit 32 that communicates with an external terminal through a network.

In addition, the information processing apparatus 3 is a server apparatus that receives a request from an external device connected through the communication unit 32 and a network and transmits a response to the request to the external device that is a source of the request.

The control unit 30 functions as a determination content adding portion 300, a determination content classifying portion 301, a feature amount calculating portion 302, a distribution map generating portion 303, a distance calculating portion 304, a classifying portion 305, a determination content notifying portion 306, an attribute information adding portion 307, and the like by executing an information processing program 310 that will be described later.

The determination content adding portion 300 adds a determination content 314 by associating the point of view when generating a answer document content 312 for a question document content 311 with the question document content 311 and the answer document content 312.

When there are plural combinations of the question document contents 311 and the answer document contents 312, the determination content classifying portion 301 classifies the combinations of the question document contents 311 and the answer document contents 312 into plural sets on the basis of the determination content 314 added to the question document contents 311 and the answer document contents 312.

The feature amount calculating portion 302 performs vector representation of answer document contents 312 included in each set using the term frequency (TF-IDF), for example, and calculates the feature amount using the multidimensional scaling (MDS). In addition, it is also possible to calculate the feature amount using other methods.

The distribution map generating portion 303 generates distribution map information 315 by plotting each of the answer document contents 312 included in each set in the feature amount space on the basis of the feature amount calculated by the feature amount calculating portion 302. In addition, the dimension of the feature amount space depends on the number of types of the feature amount calculated by the feature amount calculating portion 302.

The distance calculating portion 304 calculates a distance in the feature amount space between the plurality of pieces of answer document content 312 included in each set on the basis of the feature amount calculated by the feature amount calculating portion 302.

The classifying portion 305 classifies the answer document contents 312 included in each set on the basis of the distance in the feature amount space calculated by the distance calculating portion 304.

The determination content notifying portion 306 notifies the writer, that is, the answerer(s) of the answer document contents 312 of the determination content of the set in which the answer document contents 312 in the feature amount space are classified with good separation by the classifying portion 305, as recommended determination content.

The attribute information receiving portion 307 receives the attribute information 313 added to the answer document contents 312 in the same class or the question document content 311 in the same class, in response to the attribute information request received from the outside. The attribute information 313 includes at least an attribute name. The attribute information 313 indicates a name of class.

The storage unit 31 stores the information processing program 310, the question document content 311, the answer document content 312, the attribute information 313, the determination content 314, the distribution map information 315, and the like.

The information processing program 310 is a program to make the control unit 30 operate as the portions 300 to 307 described above.

In addition, the information processing apparatus 3 is a server apparatus or a personal computer, for example. However, it may be a mobile phone, a tablet terminal, and the like.

In addition, the information processing apparatus 3 may be configured to further include an operating unit and a display unit, so that the information processing apparatus 3 operates independently without using an external device.

(Configuration of Question Document Content and Answer Document Content)

Figure 15:
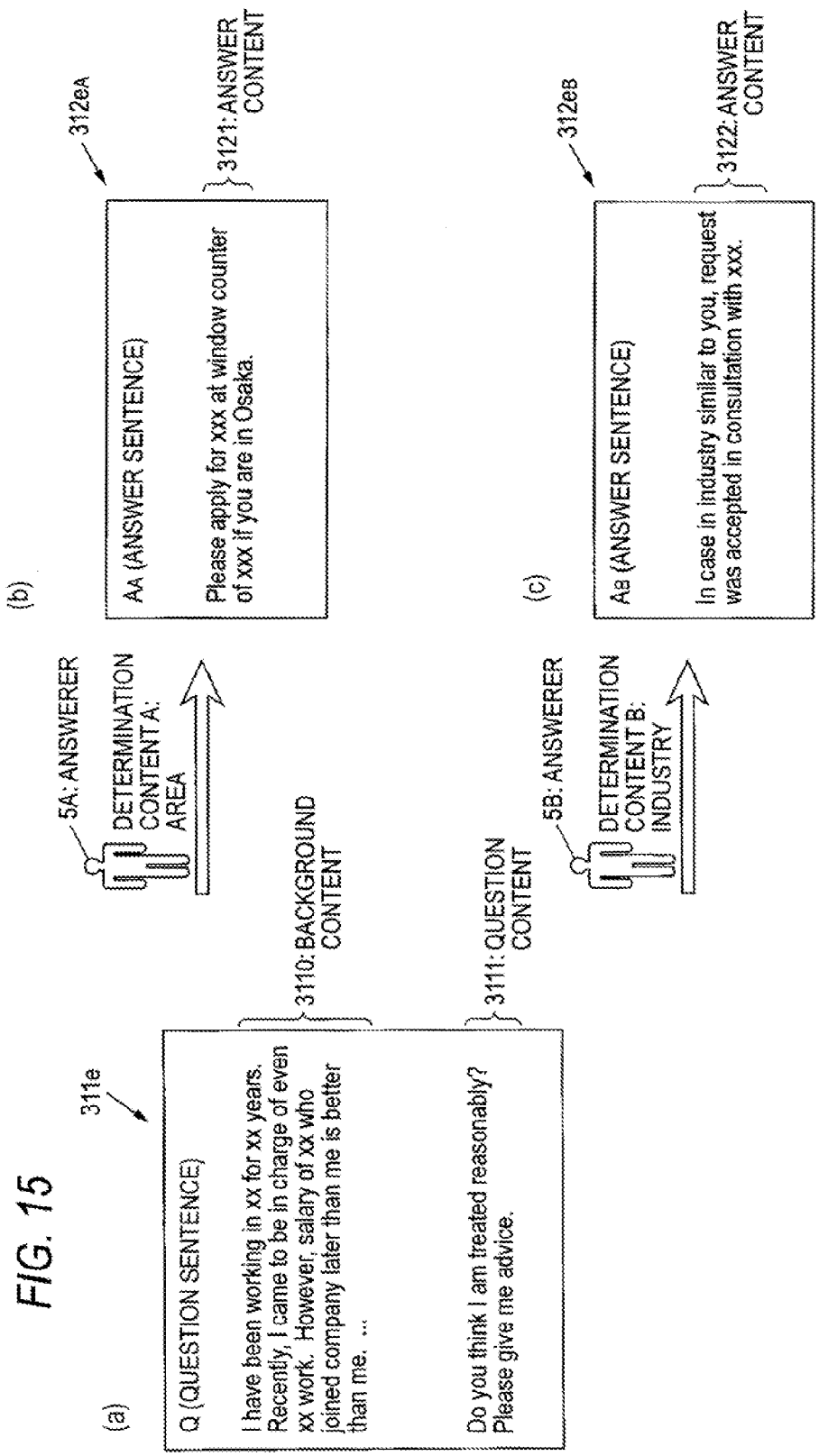
FIG. 15 is a schematic diagram showing an example of a configuration of a question document content and answer document contents.

FIG. 15 is a schematic diagram showing an example of the configuration of the question document content 311 and the answer document content 312.

A question document content 311e shown in Part (a) of FIG. 15 is an example of the question document content 311. For example, the question document content 311e is not asked from an expert who has exact knowledge of the field to be asked but from a general user (questioner) who does not have sufficient knowledge of the field to be asked. The question document content 311e includes the background content 3110 that is the premise information of the question, information derived from the question, or the like (that is not relevant to the question in essence) and the question content 3111 that is the essential content of the question. In addition, the background content 3110 is not always included. However, considering the question document content 311e is a question from the general user, the background content 3110 is often included. In addition, the question content 3111 is the essential content of the question. However, some users often fail to point out the exact content.

On the other hand, answer document contents $312e_A$ and $312e_B$ shown in Part (b) and Part (c) of FIG. 15 is generated by the expert or the like (answerers 5A and 5B) who have exact knowledge of the field to be answered. The answer document contents $312e_A$ and $312c_B$ include the answer content 3121 and 3122, respectively, which is the content of the answer to the essential content of the question.

However, even if the answerers 5A and 5B are experts who have exact knowledge of the field to be answered, when the question content 3111 does not show the exact content, the answerers 5A and 5B may generate the answer document contents $312e_A$ and $312e_B$ from different points of view. That is, the answer document content $312e_A$ has been generated by the answerer 5A from the point of view of "area", and the answer document content $312e_B$ has been generated by the answerer 5B from the point of view of "industry".

In the above assumptions, it is not preferable that the points of view of the answerer when generating the answer document content 312, that is, the determination contents 314 are different, and it is preferable for the questioner that the answer document content 312 be generated in the same point of view. Therefore, an operation to present the optimal determination content 314 to answerers when there are determination contents 314 so that the answerers generate the answer document contents 312 from the common point of view, will be described below.

(Operation of Information Processing Apparatus)

Then, an operation of the present embodiment will be described.

Figure 16B:
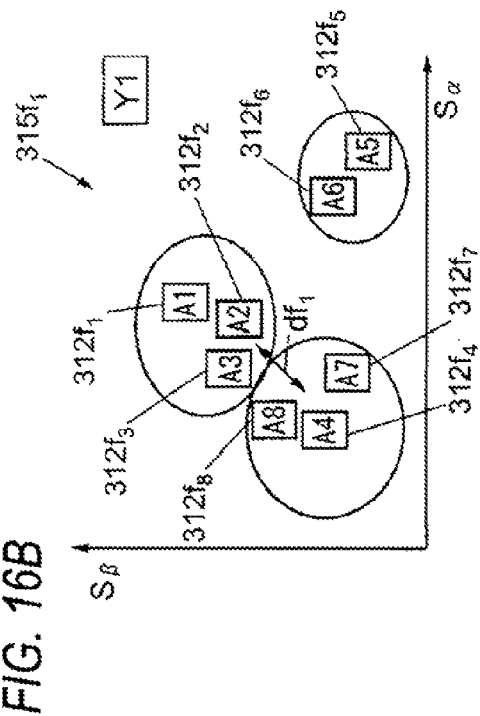
FIGS. 16A to 16C are schematic diagrams for explaining an example of an operation of the information processing apparatus.
Figure 16C:
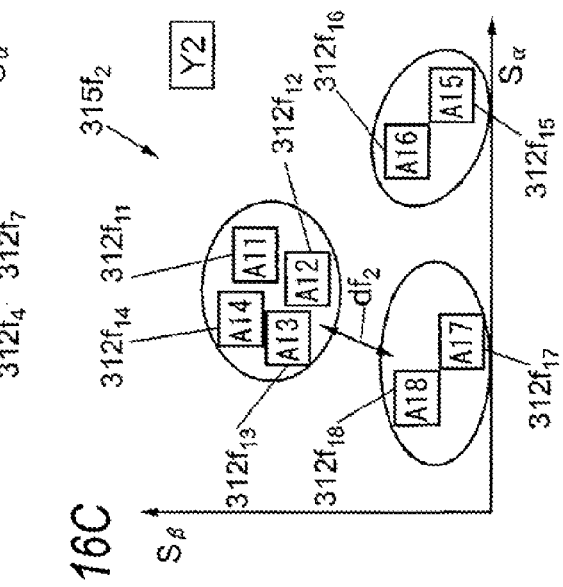
Figure 16A:
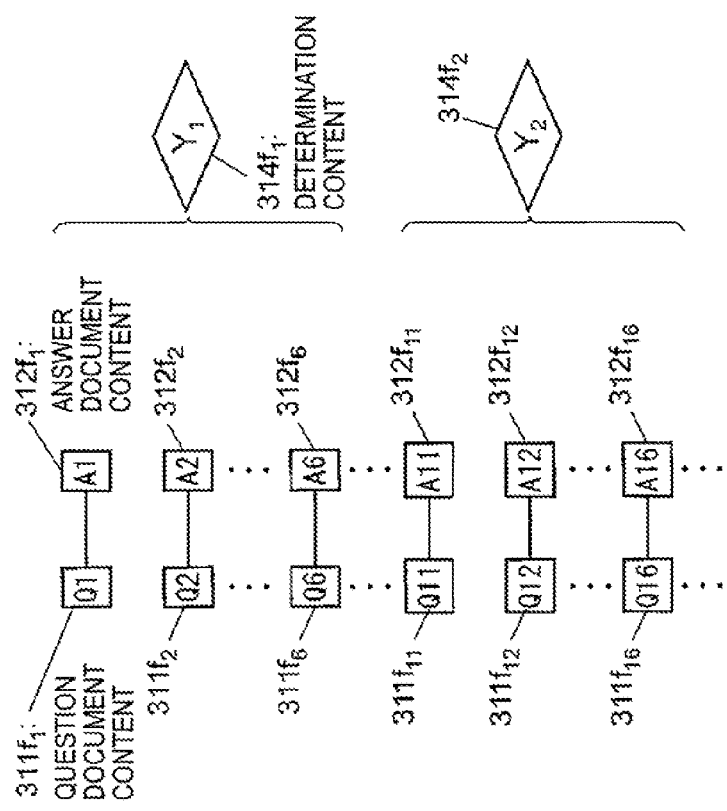
Figure 17:
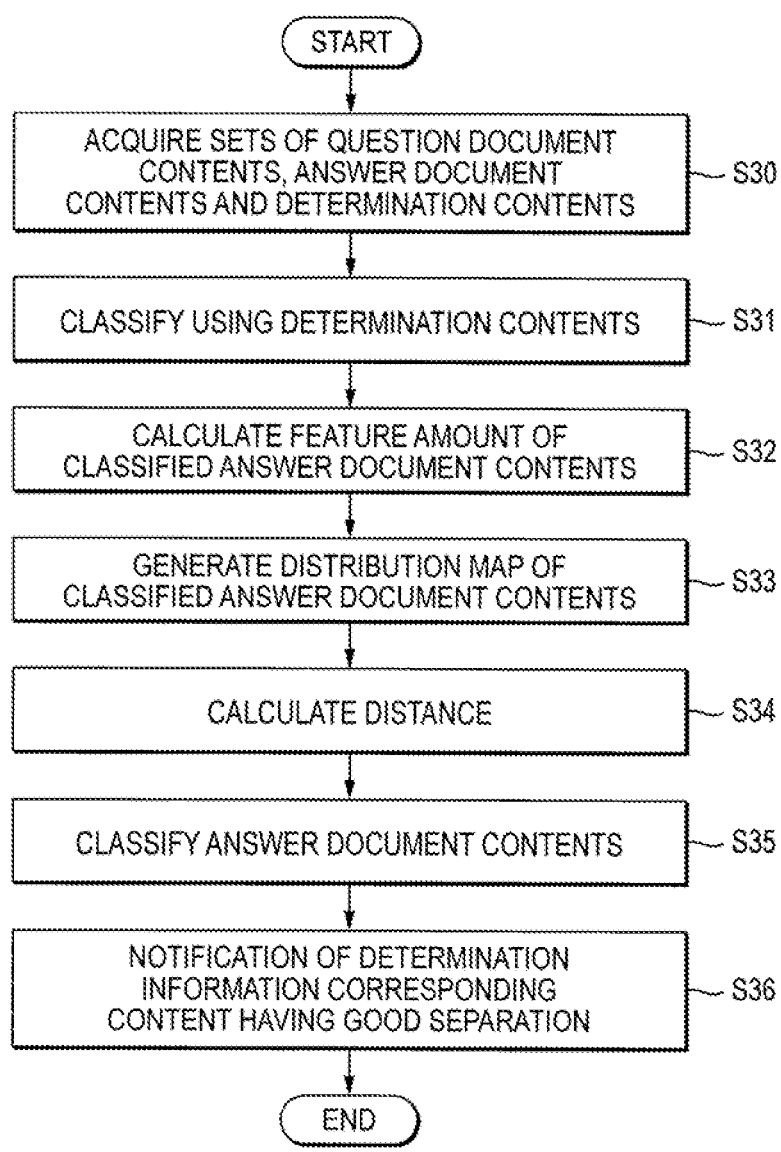
FIG. 17 is a flow chart for explaining an example of the operation of the information processing apparatus.

FIGS. 16A to 16C are schematic diagrams for explaining an example of the operation of the information processing apparatus 3. FIG. 17 is a flow chart for explaining an example of the operation of the information processing apparatus 3.

First, as shown in FIG. 16A, the answerer generates answer document contents $312f_1$, $312f_2$, $312f_3$, ... for question document contents $311f_1$, $311f_2$, $311f_3$, ..., and operates an operating unit of a terminal device (not shown), which is connected to the information processing apparatus 3 through a network, in order to associate a determination content $314f_1$ or $314f_2$ as a point of view when generating the answer document contents $312f_1$, $312f_2$, $312f_3$, .... In addition, the same attribute information $313f_1$ is added to the question document contents $311f_1$, $311f_2$, $311f_3$, ... and the answer document contents $312f_1$, $312f_2$, $312f_3$, ....

According to the operation details of the answerer, the determination content adding portion 300 of the information processing apparatus 3 adds a determination content $314f_1$ to the question document contents $311f_1$ to $311f_8$ and the answer document content $312f_1$ to $312f_8$, and adds the determination content $314f_2$ to the question document content $311f_{11}$ to $311f_{18}$ and the answer document content $312f_{11}$ to $312f_{18}$.

When there are sets of the question document contents 311, the answer document contents 312, and the determination contents 314 described above, the determination content classifying portion 301 acquires the sets (S30), and classifies the question document contents 311 and the answer document contents 312 into plural sets according to the determination contents 314 (S31). That is, in the example described above, the sets of the question document contents 311 and the answer document contents 312 are classified into a set (corresponding to the determination content $314f_1$) of the question document contents $311f_1$ to $311f_8$ and the answer document contents $312f_1$ to $312f_8$ and a set (corresponding to the determination content $314f_2$) of the question document contents $311f_{11}$ to $311f_{16}$ and the answer document contents $312f_{11}$ to $312f_{18}$.

Then, the feature amount calculating portion 302 calculates the feature amounts of the answer document contents $312f_1$ to $312f_8$ and the answer document contents $312f_{11}$ to $312f_{18}$ (S32).

Then, as shown in FIGS. 16B and 16C, the distribution map generating portion 303 generates distribution map information $315f_1$ and $315f_2$ by plotting each of the answer document contents $312f_1$ to $312f_8$ and the answer document contents $312f_{11}$ to $312f_{18}$ in the feature amount space for each of the determination contents $314f_1$ and $314f_2$ on the basis of the feature amount calculated by the feature amount calculating portion 302 (S33).

Then, the distance calculating portion 304 calculates distances $df_1$ and $df_2$ in the feature amount space between the answer document contents $312f_1$ to $312f_8$ and the answer document contents $312f_{11}$ to $312f_{18}$ on the basis of the feature amounts calculated by the feature amount calculating portion 302 (S34).

Then, when the distances in the feature amount space calculated by the distance calculating portion 304 is equal to or greater than a distance set in advance, as shown in FIGS. 16B and 16C, the classifying portion 305 classifies the answer document contents $312f_1$ to $312f_8$ and the answer document contents $312f_{11}$ to $312f_{18}$ (S35).

Then, the determination content notifying portion 306 compares and evaluates the distribution map information $315f_1$ and $315f_2$, and notifies another terminal device used by the answerer(s) of the determination content $314f_2$ of the distribution map information $315f_2$ revealing good classifying separation as a remarkable point of view when generating an answer document content (S36). Specifically, when the distance $df_2$ calculated by the distance calculation portion 304 is equal to or greater than a distance set in advance, the distribution map information $315f_2$ for the determination content $314f_2$ is deemed to reveal good classifying separation. Similarly, when the distance $df_1$ calculated by the distance calculation portion 304 is equal to or greater than the distance set in advance, the distribution map information $315f_1$ for the determination content $314f_1$ is deemed to reveal good classifying separation. And, the determination content $314f_1$ or $314f_2$ corresponding to longer one of the distance $df_1$ and $df_2$ is deemed to be the remarkable point of view. In addition, when there are plural distances equal to or greater than the distance set in advance, the determination content notifying portion 306 may notifies the determination contents in accordance with a descending order of the distances. In addition, the notification timing may be a timing when the answerer receives the answer document content 312 estimated that the attribute information $313f_1$ is added thereto, or may be an arbitrary timing requested by the answerer.

Effect of the Fifth Embodiment

According to the embodiment described above, sets of question document contents 311 and answer document contents 312 are classified using the determination contents 314 associated with the question document contents 311 and the answer document contents 312, the distribution map information 315 is generated for each of the determination contents 314 and the determination contents 314 are evaluated on the basis of the excellence of classifying separation of the answer document contents 312, and the determination content 314 of the distribution map information 315 with good classifying separation is sent to another terminal device used by the answerer as a remarkable point of view when generating an answer document content. Therefore, it is possible to generate the answer document content 312 from the same point of view shared between a plurality of answerers.

Sixth Embodiment

In a sixth embodiment, in the same configuration as in the fifth embodiment, the concept of the determination content 314 is subdivided, and the concept of the answer document content 312 is subdivided using the subdivision of the determination content 314.

(Operation of Information Processing Apparatus)

Then, an operation of the present embodiment will be described.

FIGS. 18A to 18E are schematic diagrams for explaining an example of the operation of the information processing apparatus 3 of the sixth embodiment.

Figure 18B:
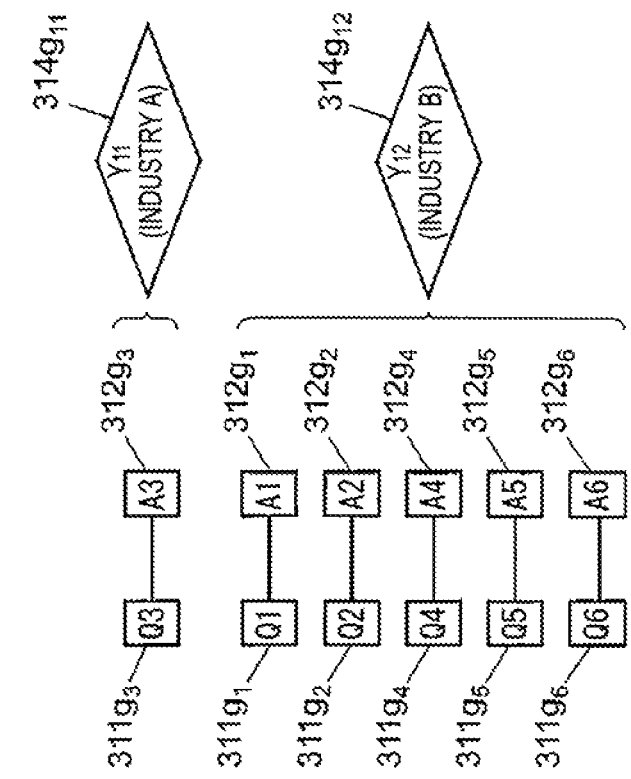
Figure 18A:
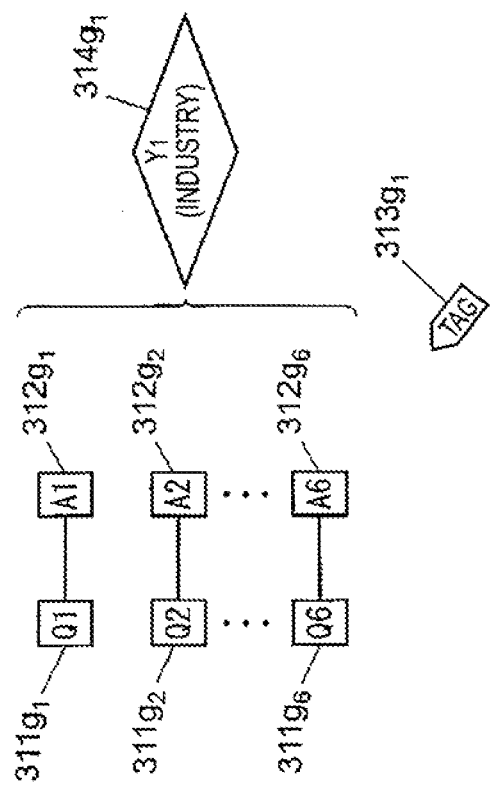

First, as shown in FIG. 18A, the answerer generates answer document contents $312g_1$, $312g_2$, $312g_3$, ..., and $312g_6$ for question document contents $311g_1$, $311g_2$, $311g_3$, ..., and $311g_6$ and operates an operating unit of a terminal device (not shown), which is connected to the information processing apparatus 3 through a network, in order to associate a determination content $314g_1$ (industry) as a point of view when generating the answer document content $312g_1$, $312g_2$, $312g_3$, ..., and $312g_6$. In addition, the same attribute information $313g_1$ is added to the question document contents $311g_1$, $311g_2$, $311g_3$, ..., and $311g_6$ and the answer document content $312g_1$, $312g_2$, $312g_3$, ..., and $312g_6$.

According to the operation details of the answerer, the determination content adding portion 300 of the information processing apparatus 3 adds the determination content $314g_1$ to the question document contents $311g_1$ to $311g_6$ and the answer document contents $312g_1$ to $312g_6$.

Then, as shown in FIG. 18B, the answerer operates an operating unit of the terminal device, which is connected to the information processing apparatus 3 through a network, in order to associate determination content $314g_{11}$ (industry A) and determination content $314g_{12}$ (industry B), which are further subdivided from the determination content $314g_1$ (industry), as a point of view when generating the question document contents $311g_1$ to $311g_6$ and the answer document contents $312g_1$ to $312g_6$. For example, a case will be described in which the answerer associates the determination content $314g_{11}$ (industry A) as a point of view when generating the answer document content $312g_3$ and associates the determination content $314g_{12}$ (industry B) as a point of view when generating the answer document contents $312g_1$, $312g_2$, and $312g_4$ to $312g_6$.

According to the operation details of the answerer, the determination content adding portion 300 of the information processing apparatus 3 adds the determination content $314g_{11}$ to the question document content $311g_3$ and the answer document content $312g_3$, and adds the determination content $314g_{12}$ to the question document contents $311g_1$, $311g_2$, and $311g_4$ to $311g_6$ and the answer document contents $312g_1$, $312g_2$, and $312g_4$ to $312g_6$.

When there are sets of the question document contents 311, the answer document content 312, and the determination contents 314 described above, the determination content classifying portion 301 acquires the sets and classifies the set of question document contents 311 and answer document contents 312 into plural sets according to the determination contents 314 as in the fifth embodiment. That is, in the example described above, the sets of the question document contents 311 and the answer document contents 312 are classified into a set (corresponding to determination content $314g_{11}$) of question document content $311g_3$ and answer document content $312g_3$ and a set (corresponding to determination content $314g_{12}$) of question document contents $311g_1$, $311g_2$, and $311g_4$ to $311g_6$ and answer document contents $312g_1$, $312g_2$, and $312g_4$ to $312g_6$.

Then, the feature amount calculating portion 302 calculates the feature amounts of the answer document content $312g_3$ and the answer document contents $312g_1$, $312g_2$, and $312g_4$ to $312g_6$ (S32).

Then, as shown in FIG. 18C, the distribution map generating portion 303 generates distribution map information $315g_{11}$ and $315g_{12}$ by plotting each of the answer document content $312g_3$ and answer document contents $312g_1$, $312g_2$, and $312g_4$ to $312g_6$ in the feature amount space for each of the determination contents $314g_{11}$ and $314g_{12}$ on the basis of the feature amount calculated by the feature amount calculating portion 302 (S33).

Then, the distance calculating portion 304 calculates a distance $d_{12}$ in the feature amount space between the answer document contents $312g_1$, $312g_2$, and $312g_4$ to $312g_6$ on the basis of the feature amounts calculated by the feature amount calculating portion 302 (S34). In addition, for the answer document content $312g_3$, distance calculation is not performed since there is only the answer document content $312g_3$.

Then, when the distance $d_{12}$ in the feature amount space calculated by the distance calculating portion 304 is equal to or greater than a distance set in advance, as shown in FIG. 18D, the classifying portion 305 classifies the answer document contents $312g_1$, $312g_2$, and $312g_4$ to $312g_6$ into a set of the answer document contents $312g_1$ and $312g_2$ and a set of the answer document contents $312g_4$ to $312g_6$.

Then, the determination content notifying portion 306 notifies the answerer(s) of the aforementioned classifying result, so that attribute information further subdivided from the attribute information $313g_1$ is to be added for each set.

As shown in FIG. 18D, the answerer adds attribute information $313g_{11}$ to the question document content $311g_3$ and the answer document content $312g_3$, adds attribute information $313g_{12}$ to the question document contents $311g_1$ and $311g_2$ and the answer document contents $312g_1$ and $312g_2$, and adds attribute information $313g_{12}'$ to the question document contents $311g_4$ to $311g_6$ and the answer document contents $312g_4$ to $312g_6$.

The relationship between the subdivided attribute information $313g_{11}$, $313g_{12}$, and $313g_{12}'$ and the attribute information $313g_1$ is shown in FIG. 18E, and the information processing apparatus 3 stores a tree structure as additional information of the attribute information 313. In addition, the relationship between the subdivided determination contents $314g_{11}$ and $314g_{12}$ and the determination contents $314g_1$ is also the tree structure similar to the above, and this structure may be presented to the answerer when generating answer document content so that the answerer selects appropriate determination content.

In addition, as in the fourth embodiment, the learning portion 206 may generate the learning information 215 by learning the question document content $311g_3$ to which the subdivided attribute information $313g_{11}$ is given, the question document contents $311g_1$ and $311g_2$ to which the subdivided attribute information $313g_{12}$ is given, and the question document content $311g_4$ to $311g_6$ to which the subdivided attribute information $313g_{12}'$ is given.

Effect of the Sixth Embodiment

According to the embodiment described above, the determination content 314 is subdivided to classify the sets of the question document contents 311 and the answer document contents 312, and the distribution map information 315 is generated for each subdivided determination content 314 and is further classified. Therefore, the subdivided attribute information 313 can be added to the question document contents 311 and the answer document contents 312. In addition, since the structure of the subdivided determination contents 314 is presented to the answerer, the answerer can select the appropriate subdivided determination content 314 according to the structure.

In addition, in the case of classifying document contents by plural users as in the second embodiment, when the present embodiment is applied so that document contents are classified by subdividing the determination content 314 and the attribute information 313 by a plurality of answerers (it is assumed that the users A to C in FIG. 4A are answerers A to C and the document contents $111a_A$ to $111a_C$ are answer document content $111a_A$ to $111a_C$), the determination content 314 and the attribute information 313 that are not subdivided may be adopted without adopting the determination content 314 and the attribute information 313 that are subdivided by each answerer if document content is not classified when pieces of answer document contents of a plurality of answerers are combined (refer to FIG. 4C) even if the determination content 314 and the attribute information 313 subdivided by each answerer are added (refer to FIG. 4B).

Other Embodiments

Although each function of the portions 100 to 105 in the control unit 10 is realized by the program in the embodiments described above, all or a part of the portions may be realized by hardware, such as an ASIC. In addition, the program used in the embodiments described above may be provided in a state recorded on a recording medium, such as a CD-ROM. In addition, replacement, deletion, addition, and the like of the above steps described in the above embodiments are possible within the scope that does not change the spirit of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for information processing, the process comprising:

acquiring question document contents and answer document contents, which are in a relationship of questions and answers;

acquiring determination contents each indicating a different point of view of an answerer when answering the question;

classifying the answer document contents in which a first one of the determination contents is set to a first set of the answer document contents and a second one of the determination contents different from the first one of the determination contents is set to a second set of the answer document contents;

calculating a first feature amount of each of the first set of the answer document contents and a second feature amount of each of the second set of the answer document contents;

calculating first distances between the first set of the answer document contents on the basis of the calculated first feature amounts;

calculating second distances between the second set of the answer document contents on the basis of the calculated second feature amounts;

classifying the first set of the answer document contents so that, in a case that there is the first distance equal to or greater than a value set in advance between a first subset of the first set of the answer document contents and a second subset of the first set of the answer document contents, first attribute information is added to the first subset of the first set of the answer document contents and second attribute information different from the first attribute information is added to the second subset of the first set of the answer document contents;

classifying the second set of the answer document contents so that, in a case that there is the second distance equal to or greater than the value set in advance between a first subset of the second set of the answer document contents and a second subset of the second set of the answer document contents, third attribute information is added to the first subset of the second set of the answer document contents and fourth attribute information different from the third attribute information is added to the second subset of the second set of the answer document contents;

comparing the first distance and the second distance;

in a case that the first distance is greater than the second distance, determining that the first determination contents is a remarkable point for generating the answer from the question on the basis of classifying results of the classifying; and in a case that the second distance is greater than the first distance, determining that the second determination contents is the remarkable point for generating the answer from the question on the basis of the classifying results of the classifying.

2. An information processing apparatus, comprising:

a processor programmed to:

acquire question document contents and answer document contents, which are in a relationship of questions and answers;

acquire determination contents each indicating a different point of view of an answerer when answering the question;

classify the answer document contents in which a first one of the determination contents is set to a first set of the answer document contents and a second one of the determination contents different from the first one of the determination contents is set to a second set of the answer document contents;

calculate a first feature amount of each of the first set of the answer document contents and a second feature amount of each of the second set of the answer document contents;

calculate first distances between the first set of the answer document contents on the basis of the calculated first feature amounts and second distances between the second set of the answer document contents on the basis of the calculated second feature amounts;

classify the first set of the answer document contents so that, in a case that there is the first distance equal to or greater than a value set in advance between a first subset of the first set of the answer document contents and a second subset of the first set of the answer document contents, first attribute information is added to the first subset of the first set of the answer document contents and second attribute information different from the first attribute information is added to the second subset of the first set of the answer document contents;

compare the first distance and the second distance;

in a case that the first distance is greater than the second distance, determine that the first determination contents is a remarkable point for generating the answer from the question on the basis of classifying results of the classifying; and in a case that the second distance is greater than the first distance, determine that the second determination contents is the remarkable point for generating the answer from the question on the basis of the classifying results of the classifying.

3. The non-transitory computer readable medium according to claim 1, the process further comprising:

generating first distribution map information by plotting each of the first set of the answer document contents in a first feature amount space on the basis of the calculated first feature amount; and generating second distribution map information by plotting each of the second set of the answer document contents in a second feature amount space on the basis of the calculated second feature amount.

4. The information processing apparatus according to claim 2, wherein the processor is programmed to generate:

first distribution map information by plotting each of the first set of the answer document contents in a first feature amount space on the basis of the calculated first feature amount; and second distribution map information by plotting each of the second set of the answer document contents in a second feature amount space on the basis of the calculated second feature amount.

* * * * *